US012377004B2

(12) United States Patent
Sweeney et al.

(10) Patent No.: US 12,377,004 B2
(45) Date of Patent: Aug. 5, 2025

(54) PATIENT SUPPORT SYSTEMS WITH A CHAIR CONFIGURATION AND A STOWABLE FOOT SECTION

(71) Applicant: Stryker Corporation, Kalamazoo, MI (US)

(72) Inventors: Christopher Ryan Sweeney, Portage, MI (US); James K. Galer, Byron Center, MI (US); Gary L. Bartley, Kalamazoo, MI (US); William Dwight Childs, Plainwell, MI (US); Connor Feldpausch St. John, Kalamazoo, MI (US)

(73) Assignee: Stryker Corporation, Portage, MI (US)

( * ) Notice: Subject to any disclaimer, the term of this patent is extended or adjusted under 35 U.S.C. 154(b) by 191 days.

(21) Appl. No.: 17/691,457

(22) Filed: Mar. 10, 2022

(65) Prior Publication Data

US 2022/0192905 A1 Jun. 23, 2022

Related U.S. Application Data

(63) Continuation of application No. 15/693,714, filed on Sep. 1, 2017, now Pat. No. 11,304,864.

(Continued)

(51) Int. Cl.

| | |
|---|---|
| ***A61G 7/015*** | (2006.01) |
| ***A47C 27/12*** | (2006.01) |

(Continued)

(52) U.S. Cl.

CPC ............ *A61G 7/015* (2013.01); *A61G 5/006* (2013.01); *A61G 5/14* (2013.01); *A61G 7/008* (2013.01);

(Continued)

(58) Field of Classification Search

CPC ...... A61G 7/008; A61G 7/012; A61G 7/0514; A61G 7/0524; A61G 7/05769;

(Continued)

(56) References Cited

U.S. PATENT DOCUMENTS

| | | | | |
|---|---|---|---|---|
| 1,398,203 A * | 11/1921 | Schmidt | ................ | A61G 7/015<br>5/411 |
| 2,869,614 A * | 1/1959 | Wamsley | .............. | A61G 5/006<br>280/211 |

(Continued)

FOREIGN PATENT DOCUMENTS

| | | |
|---|---|---|
| AU | 2010202928 A1 | 1/2011 |
| CN | 101077325 A | 11/2007 |

(Continued)

OTHER PUBLICATIONS

English language abstract and machine-assisted English translation for KR 2013-0076922 extracted from espacenet.com database on Aug. 20, 2018, 8 pages.

(Continued)

*Primary Examiner* — Justin C Mikowski
*Assistant Examiner* — Morgan J McClure
(74) *Attorney, Agent, or Firm* — Howard & Howard Attorneys PLLC

(57) ABSTRACT

A patient support system comprises a patient support apparatus for patients. The patient support apparatus comprises a base and a litter supported by the base via a lift system. The litter comprises a seat section and a foot section movable relative to the seat section. The lift system comprises lift members. The lift system moves the litter from a first configuration in which the seat and foot sections are generally horizontal relative to a floor surface to a second configuration where the foot section is below the seat section and between the lift members. The patient support apparatus (Continued)

also comprises a mattress assembly integrated with the foot section to move with the foot section between the first and second configurations.

20 Claims, 15 Drawing Sheets

Related U.S. Application Data

(60) Provisional application No. 62/382,871, filed on Sep. 2, 2016.

(51) Int. Cl.
*A47C 27/14* (2006.01)
*A47C 27/15* (2006.01)
*A47C 27/16* (2006.01)
*A61G 5/00* (2006.01)
*A61G 5/14* (2006.01)
*A61G 7/008* (2006.01)
*A61G 7/012* (2006.01)
*A61G 7/018* (2006.01)
*A61G 7/05* (2006.01)
*A61G 7/057* (2006.01)
*A61G 7/075* (2006.01)
*A61G 7/16* (2006.01)

(52) U.S. Cl.
CPC ........... *A61G 7/012* (2013.01); *A61G 7/0514* (2016.11); *A61G 7/0524* (2016.11); *A61G 7/05769* (2013.01); *A61G 7/0755* (2013.01); *A61G 7/16* (2013.01); *A47C 27/12* (2013.01); *A47C 27/14* (2013.01); *A47C 27/15* (2013.01); *A47C 27/16* (2013.01); *A61G 7/018* (2013.01)

(58) Field of Classification Search
CPC ........ A61G 7/0755; A61G 7/16; A61G 7/018; A61G 7/015; A61G 7/002; A61G 5/006; A61G 5/14; A47C 27/14; A47C 27/22; A47C 27/12; A47C 27/127; A47C 27/122; A47C 27/121; A47C 27/148; A47C 27/15; A47C 27/16
See application file for complete search history.

(56) References Cited

U.S. PATENT DOCUMENTS 3,085,258 A 4/1963 Wolferts
3,095,235 A * 6/1963 Babcock ................ A61G 5/006 297/115
3,210,779 A * 10/1965 Herbold ............... A47C 17/163 297/19
3,281,141 A * 10/1966 Smiley ................... A61G 13/00 5/618
3,406,772 A * 10/1968 Ahrent ................... A61G 5/066 297/DIG. 10
3,893,198 A * 7/1975 Blair ...................... A47C 27/14 128/889
4,046,419 A * 9/1977 Schmitt .................. A47C 9/022 297/411.32
4,059,255 A * 11/1977 Perold .................. A61G 13/009 5/610
4,183,109 A * 1/1980 Howell .................. A61G 7/002 297/DIG. 10
4,258,445 A * 3/1981 Zur .......................... A61G 7/02 5/604
4,270,234 A * 6/1981 James .................. A61G 7/1074 5/88.1
4,712,834 A * 12/1987 Warrick ................. B64D 11/06 297/216.17
4,724,555 A 2/1988 Poehner et al.
4,801,176 A * 1/1989 Wolberg ................ A47C 4/286 5/116
4,805,249 A 2/1989 Usman et al.
4,811,435 A * 3/1989 Foster .................. A61G 7/0506 5/53.1
4,819,283 A 4/1989 DiMatteo et al.
4,858,992 A * 8/1989 LaSota ................. B60N 2/0028 297/452.63
4,945,585 A * 8/1990 Stewart .................. A47C 23/18 5/122
4,987,620 A 1/1991 Sharon
5,023,968 A 6/1991 Diehl et al.
5,058,952 A * 10/1991 LaSota ..................... A47C 7/28 297/452.23
5,063,625 A * 11/1991 Perry ................... A47C 27/066 267/89
5,088,747 A * 2/1992 Morrison ............. A61G 5/1043 297/283.1
5,103,511 A * 4/1992 Sequin ................. A47C 21/006 5/607
5,134,737 A 8/1992 Wyman
5,230,113 A 7/1993 Foster et al.
5,257,426 A 11/1993 Leoutsakos
5,299,334 A 4/1994 Gonzalez
5,398,357 A * 3/1995 Foster .................... A61G 7/015 5/624
5,479,666 A * 1/1996 Foster .................... A61G 7/002 5/624
5,513,406 A 5/1996 Foster et al.
5,555,582 A 9/1996 Jerideau
5,613,252 A 3/1997 Yu et al.
5,680,661 A 10/1997 Foster et al.
5,715,548 A * 2/1998 Weismiller ............. A61G 7/052 5/624
5,737,786 A * 4/1998 Yamamoto ............... A61G 7/02 5/81.1 R
5,774,914 A * 7/1998 Johnson ............... A61G 7/0514 5/613
6,082,824 A * 7/2000 Chow .................. A61G 5/1045 297/452.56
6,088,858 A * 7/2000 Juster ................... A47C 31/105 5/691
6,298,511 B1 10/2001 Collymore
6,374,436 B1 * 4/2002 Foster .................. A61G 7/0509 5/624
6,397,416 B2 6/2002 Brooke et al.
6,584,628 B1 * 7/2003 Kummer ................ A61G 7/002 5/713
6,640,360 B2 11/2003 Hornbach et al.
6,694,548 B2 2/2004 Foster et al.
6,725,474 B2 4/2004 Foster et al.
6,846,042 B2 * 1/2005 Hanson ................ A61G 5/1075 297/69
6,851,142 B2 2/2005 Stryker et al.
7,028,352 B2 * 4/2006 Kramer .................. A61G 7/053 428/430
7,039,968 B1 * 5/2006 Warmoth .................. B60P 3/36 5/118
7,213,279 B2 * 5/2007 Weismiller ............. A61G 7/002 5/624
7,331,071 B1 * 2/2008 Cherubini ............. G08B 21/22 5/652
7,636,966 B2 12/2009 Gallant et al.
7,690,060 B2 4/2010 Rodrigues Moreira
7,716,762 B2 * 5/2010 Ferraresi .............. A61G 7/0573 5/607
7,761,942 B2 * 7/2010 Benzo .................. A61G 7/0573 5/613
7,802,328 B2 * 9/2010 Lingegard ............ A61G 7/1078 5/89.1
7,886,379 B2 2/2011 Benzo et al.
7,895,688 B1 * 3/2011 Rowes ................... A61G 7/001 5/607
8,336,133 B2 12/2012 Palay et al.
D677,919 S * 3/2013 Voyce, IV ...................... D6/367
8,474,076 B2 7/2013 Hornbach
8,578,531 B2 11/2013 Abernathey et al.

(56) References Cited

U.S. PATENT DOCUMENTS 8,646,844 B2 * 2/2014 Blind ........................ B60N 2/99 297/452.4
8,677,524 B2 3/2014 Kume et al.
8,793,824 B2 8/2014 Poulos et al.
8,844,075 B2 * 9/2014 Heimbrock .............. A61G 7/16 5/722
8,864,205 B2 10/2014 Lemire et al.
8,959,681 B2 * 2/2015 Richards .................. A61G 7/16 5/616
8,973,187 B2 * 3/2015 Hornbach ............ A61G 7/0514 5/613
9,138,173 B2 9/2015 Penninger et al.
9,199,560 B2 * 12/2015 Line ................... B60N 2/42781
9,306,322 B2 4/2016 Bhimavarapu et al.
9,763,841 B2 * 9/2017 Carlson ................ A61G 5/1043
10,569,672 B1 * 2/2020 Kooker .................... B60N 2/20
10,610,429 B2 4/2020 Heneveld, Jr. et al.
10,765,575 B2 9/2020 Bartley et al.
10,813,807 B2 10/2020 Bartley
10,864,128 B2 12/2020 Heneveld, Jr. et al.
11,304,864 B2 4/2022 Sweeney et al.
2003/0034183 A1 * 2/2003 Kortesmaki .......... B66F 9/0755 177/142
2004/0064886 A1 4/2004 Alverson et al.
2004/0177445 A1 9/2004 Osborne et al.
2006/0053562 A1 * 3/2006 Poulos ................ A61G 7/0509 5/722
2006/0085914 A1 * 4/2006 Peterson ................ A61G 7/051 5/430
2006/0117479 A1 * 6/2006 Kawakami ............. A61G 7/015 5/411
2006/0130239 A1 6/2006 Smith
2009/0094744 A1 * 4/2009 Benzo .................... A61G 7/015 5/608
2009/0094746 A1 * 4/2009 Ferraresi ................ A61G 7/015 5/607
2010/0011506 A1 * 1/2010 Jensen ................... A61G 1/013 5/628
2010/0017964 A1 1/2010 Kruse
2010/0064439 A1 * 3/2010 Soltani ................. A61G 7/0509 5/618
2010/0212087 A1 8/2010 Leib et al.
2010/0319130 A1 * 12/2010 Masson .................... A61G 7/16 5/618
2011/0162142 A1 7/2011 Hakamiun et al.
2011/0232001 A1 * 9/2011 Poulos ..................... A61G 7/05 5/658
2012/0007340 A1 * 1/2012 Bar Noy ................ A61G 1/042 280/640
2012/0117732 A1 * 5/2012 O'Keefe ................ A61G 7/053 5/624
2012/0124745 A1 * 5/2012 Heimbrock ............ A61G 7/015 5/618
2012/0137439 A1 * 6/2012 Heimbrock ............ A61G 7/053 5/618
2012/0169093 A1 7/2012 Kume et al.
2012/0198626 A1 * 8/2012 Richards .............. A61G 7/0514 5/607
2012/0198628 A1 * 8/2012 Richards ................ A61G 7/053 5/618
2012/0297544 A1 11/2012 Griswold et al.
2013/0081205 A1 * 4/2013 Frondorf ................ A61G 7/015 5/613
2013/0161923 A1 * 6/2013 Sprigle ................ A61G 5/1091 280/250.1
2013/0212807 A1 * 8/2013 Manson ................... A61G 7/16 5/618
2013/0227787 A1 9/2013 Herbst et al.
2014/0157515 A1 * 6/2014 Manson ................... A61G 7/16 5/13
2014/0259388 A1 * 9/2014 Manson ................. A47C 17/16 5/690
2014/0259420 A1 9/2014 Lambarth et al.
2014/0265181 A1 * 9/2014 Lambarth ............ A61G 1/0275 280/28.5
2014/0325759 A1 * 11/2014 Bly ........................ A61G 7/015 5/613
2015/0115628 A1 4/2015 Wittelsbuerger et al.
2015/0115638 A1 4/2015 Lambarth et al.
2015/0164722 A1 6/2015 Roussy et al.
2016/0013837 A1 1/2016 Howell et al.
2016/0022039 A1 1/2016 Paul et al.
2016/0074264 A1 * 3/2016 Davis ..................... A61G 7/072 5/613
2016/0089283 A1 3/2016 DeLuca et al.
2016/0193095 A1 7/2016 Roussy et al.
2016/0302985 A1 10/2016 Tessmer et al.
2017/0056267 A1 3/2017 Stryker et al.
2017/0079434 A1 3/2017 Paul et al.
2017/0172829 A1 6/2017 Tessmer et al.
2018/0000670 A1 1/2018 Bartley et al.
2018/0000672 A1 1/2018 Heneveld, Jr. et al.
2018/0000673 A1 1/2018 Bartley
2018/0000674 A1 1/2018 Bartley
2018/0000675 A1 1/2018 Heneveld, Jr. et al.
2018/0064589 A1 3/2018 Sweeney et al.
2018/0064591 A1 3/2018 Sweeney et al.
2018/0064592 A1 3/2018 Sweeney et al.
2023/0165743 A1 * 6/2023 Monson .................. H02J 50/90 601/55

FOREIGN PATENT DOCUMENTS

DE 4039253 A1 6/1992
EP 262771 A1 4/1988
EP 0932385 B1 3/2004
EP 2481388 A1 8/2012
EP 2484326 A2 8/2012
EP 2481388 B1 11/2015
GB 905708 A 9/1962
JP 2014188340 A 10/2014
KR 20130076922 A 7/2013
WO 2007055051 A1 5/2007
WO 2015126742 A1 8/2015
WO 2016171746 A1 10/2016

OTHER PUBLICATIONS

English language abstract and machine-assisted translation for CN101077325 extracted from espacenet.com on Mar. 27, 2018; 4 pages.
English language abstract and machine-assisted translation for DE4039253 extracted from espacenet.com on Mar. 27, 2018; 5 pages.
English language abstract for JP5432400 extracted from espacenet.com on Mar. 27, 2018; 1 page.
English language abstract for WO2007055051 extracted from espacenet.com on Mar. 27, 2018; 1 page.
Hill-Rom Services, Inc., "Progressa(TM) Bed System, Advancing mobility. Accelerating Recovery." 2013; 16 pages.
Hill-Rom Services, Inc., "Progressa(TM) Bed System, Technical Specifications", 2013; 4 pages.
L.L. Bean Inc., "Camp Comfort Recliner", URL: https://www.llbean.com/llb/shop/111730?page=llbean-camp-comfort-recliner.
Positive Posture LLC, "Luma Designer Recliner", URL: https://www.positiveposture.com/products/recliners/luma/.

* cited by examiner

FIG. 3B
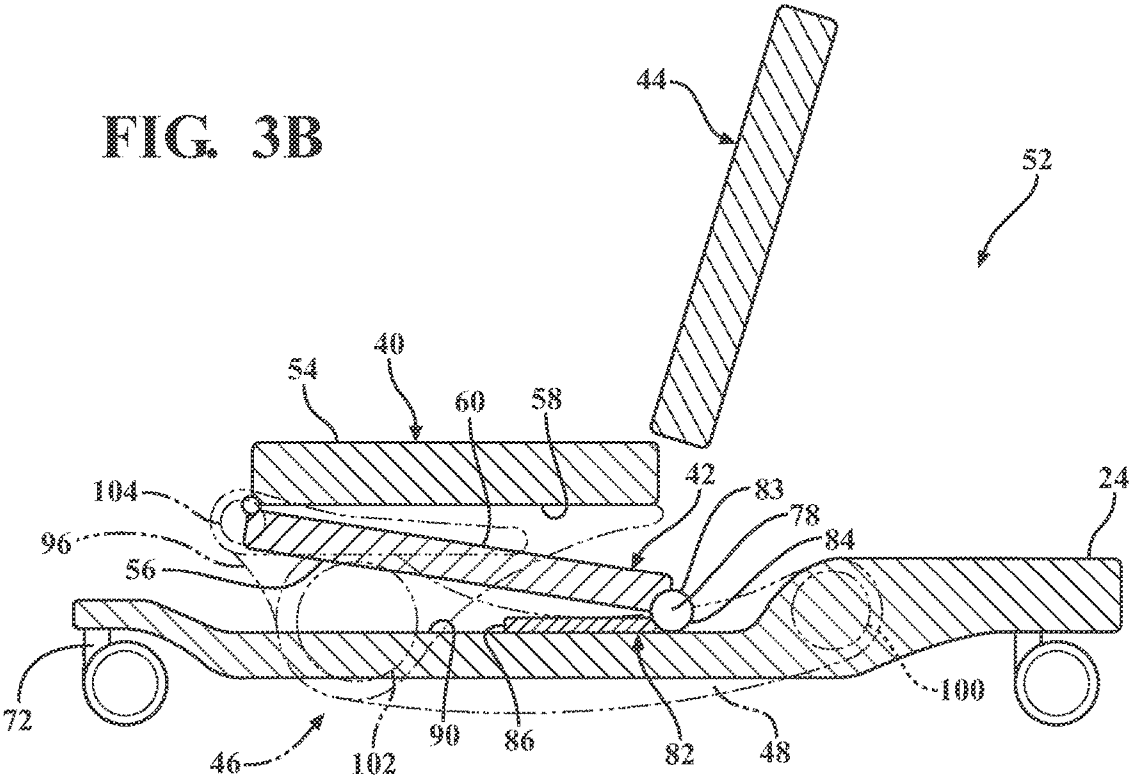
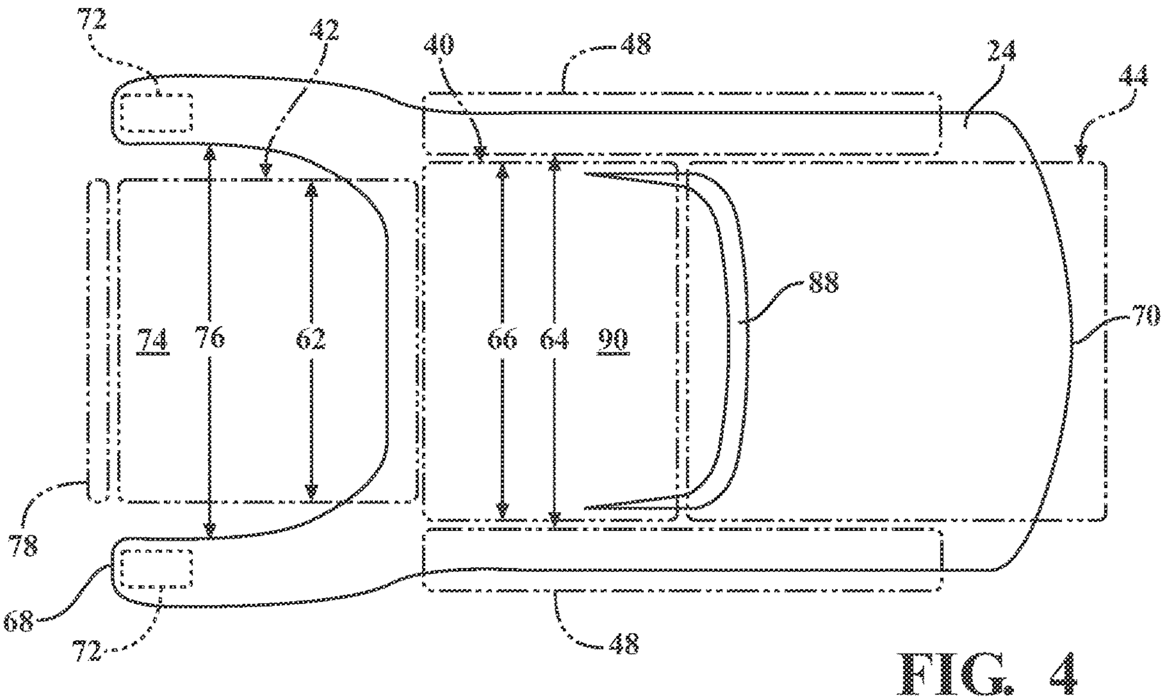
FIG. 4

FIG. 5A
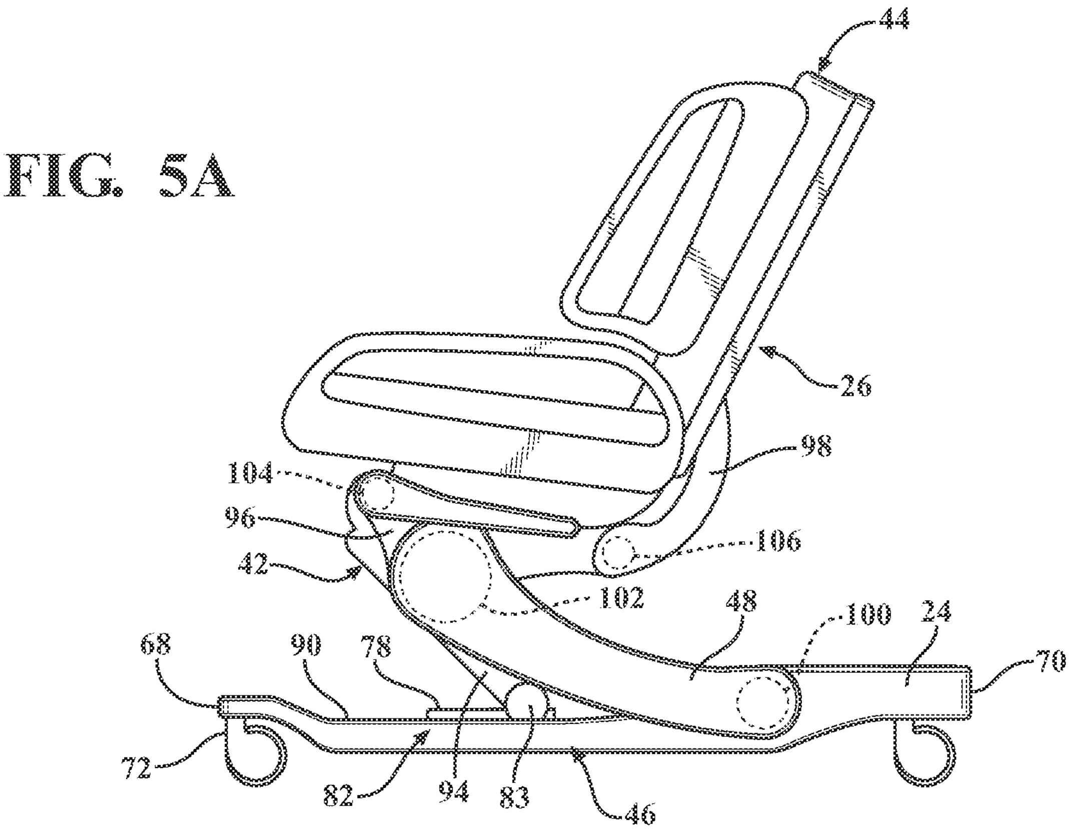
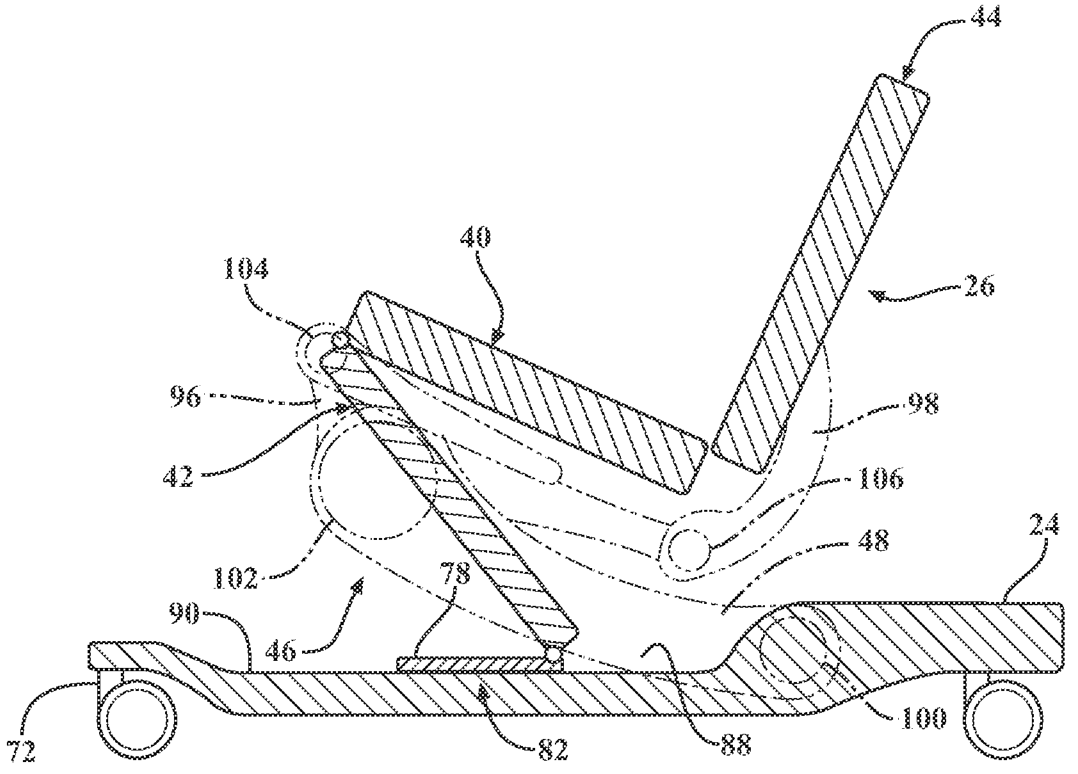
FIG. 5B

FIG. 7A
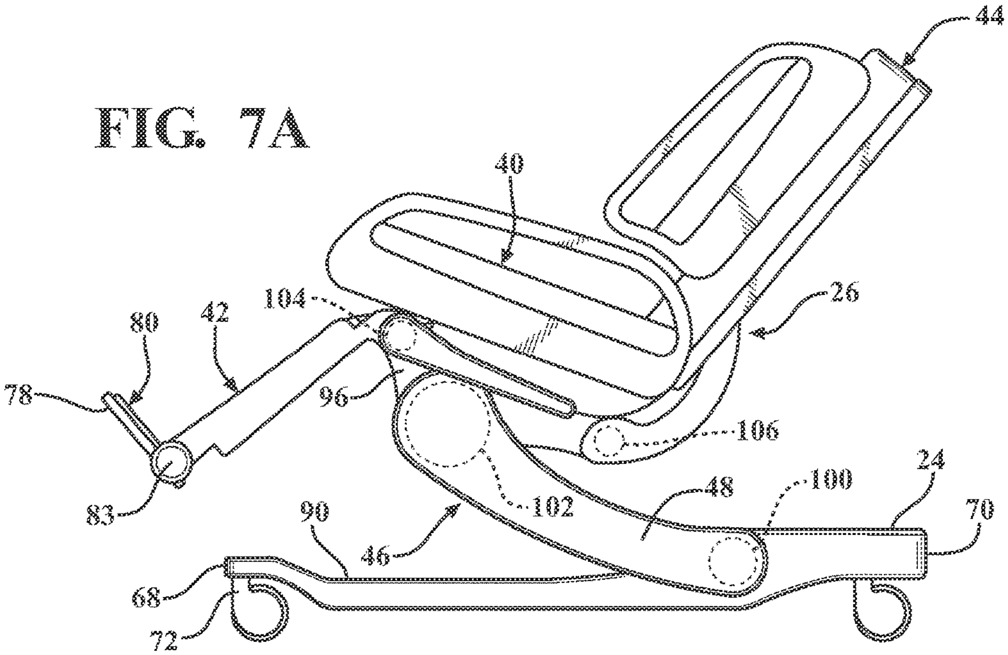
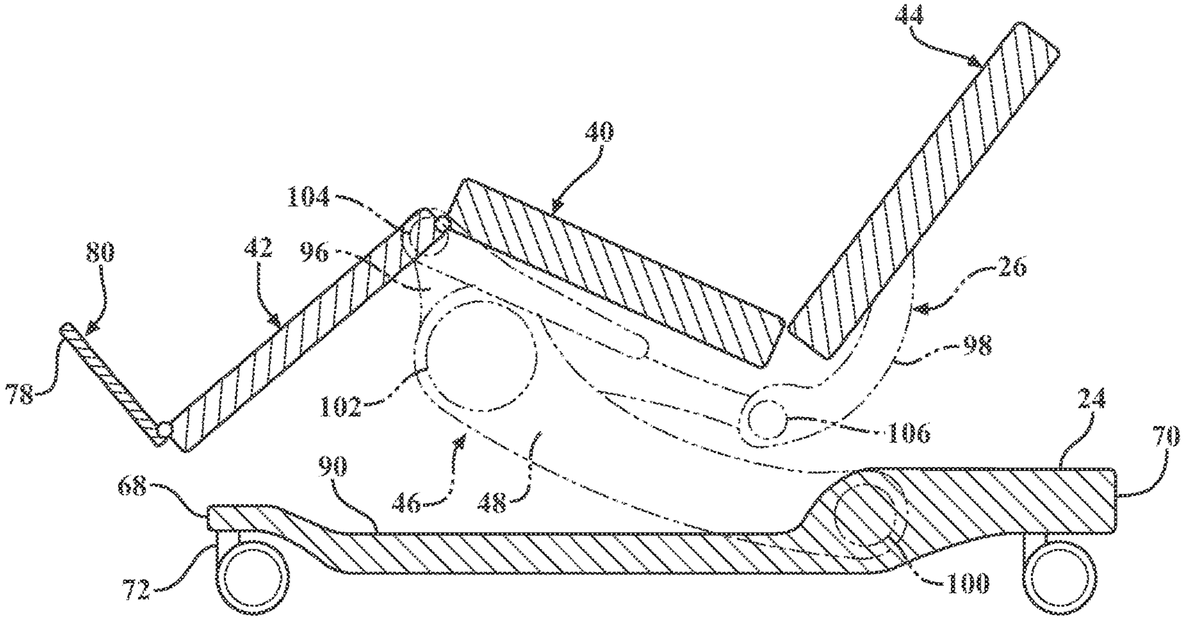
FIG. 7B

PATIENT SUPPORT SYSTEMS WITH A CHAIR CONFIGURATION AND A STOWABLE FOOT SECTION

RELATED APPLICATIONS

This application is a Continuation of U.S. patent application Ser. No. 15/693,714, filed on Sep. 1, 2017, which claims priority to and the benefit of U.S. Provisional Patent Application No. 62/382,871, filed on Sep. 2, 2016, the disclosures of each of which are hereby incorporated by reference in their entirety.

BACKGROUND

Patient support systems facilitate care of patients in a health care setting. Patient support systems comprise patient support apparatuses such as, for example, hospital beds, stretchers, cots, and wheelchairs. Conventional patient support apparatuses comprise a base and a litter upon which the patient is supported. Often, patient support apparatuses have a lift system that may be used to raise and lower the litter and thus the patient relative to the base. These litters typically have several sections, including a fowler section, a seat section, and a foot section with the fowler section and the foot section being capable of articulation relative to the seat section via articulation actuators. On some occasions, the lift system in conjunction with the articulation actuators may move the litter relative to the base while articulating one or more of the sections such that the litter is reconfigured from a bed configuration to a chair configuration.

A patient support apparatus being able to move from a bed configuration to a chair configuration helps patients with limited mobility get into a position that will enable them to regain mobility more easily. Typically, when the litter is moved to the chair configuration from the bed configuration, the foot section is lowered to a generally vertical orientation, which limits lowering of the litter. In some instances, the foot section includes a footboard. Typically, to move the litter into the chair configuration, the footboard must be removed from the foot section for the patient to be able to reach a floor surface. The patient support apparatus often includes a mattress disposed on the litter for patient comfort. Typically, when the litter moves from the bed configuration to the chair configuration, the mattress encounters difficulty in folding with the foot section relative to the seat section into the chair configuration. A patient support apparatus designed to overcome one or more of the aforementioned challenges is desired.

BRIEF DESCRIPTION OF THE DRAWINGS

FIG. 3B is an elevational view illustrating a partial cross-section of FIG. 3A.

FIG. 4 is a plan view showing individual sections of the litter and features of a base supporting the litter.

FIG. 5A is an elevational view of the litter in an intermediate configuration.

FIG. 5B is an elevational view illustrating a partial cross-section of FIG. 5A.

FIG. 7A is an elevational view of the litter in an alternative intermediate configuration.

FIG. 7B is an elevational view illustrating a partial cross-section of FIG. 7A.

DETAILED DESCRIPTION

Figure 1:
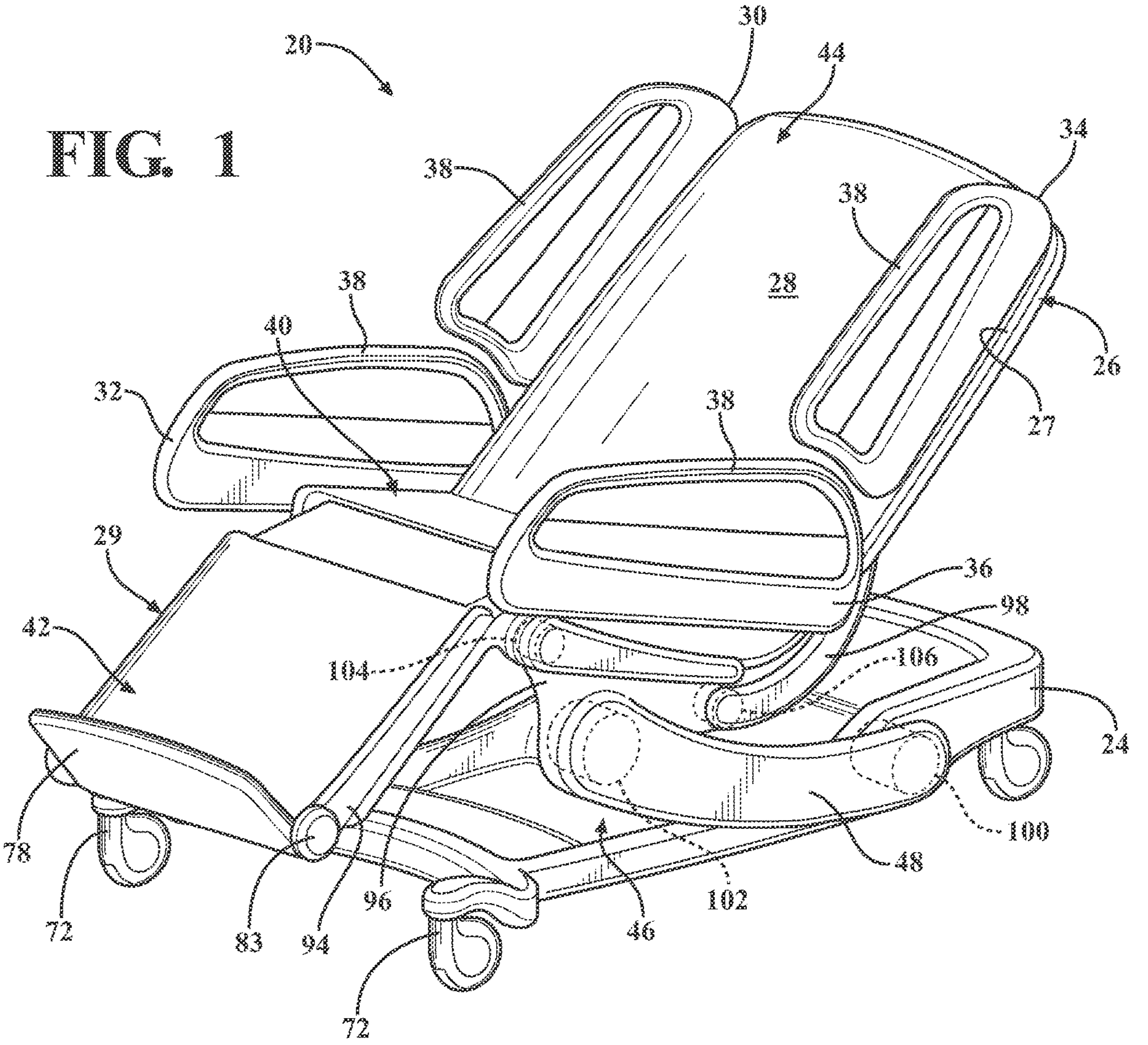
FIG. 1 is a perspective view of a patient support apparatus.

Referring to FIG. 1, a patient support system comprising a patient support apparatus 20 is shown for supporting a patient in a health care setting. The patient support apparatus 20 illustrated in FIG. 1 comprises a hospital bed. In other embodiments, however, the patient support apparatus 20 may comprise a stretcher, cot, table, wheelchair, or similar apparatus utilized in the care of a patient.

A support structure provides support for the patient. The support structure illustrated in FIG. 1 comprises a base 24 and a litter 26. The litter 26 is spaced above the base 24. The litter 26 comprises several sections, some of which are capable of being articulated relative to each other, such as a fowler section 44, a seat section 40, and a foot section 42. The fowler section 44 and the foot section 42 may pivot relative to the seat section 40, or may articulate relative to the seat section 40 in any manner. For instance, the fowler section 44 and/or the foot section 42 may both pivot and translate relative to the seat section 40. The litter 26 provides a primary patient support surface 27 upon which the patient is supported.

A mattress 29 may be disposed on or integral with the litter 26. The mattress 29 comprises a secondary patient support surface 28 upon which the patient is supported. The base 24, litter 26, and patient support surfaces 27, 28 each have a head end and a foot end corresponding to designated placement of the patient's head and feet on the patient support apparatus 20. The construction of the support structure may take on any known or conventional design, and is not limited to that specifically set forth above. In addition, the mattress 29 may be omitted in certain embodiments, such that the patient rests directly on the patient support surface 27. In many embodiments, the mattress 29 is integrated with at least a portion of the litter 26. Details regarding embodiments where the mattress 29 is integrated with the litter 26 are discussed further below.

Side rails 30, 32, 34, 36 are coupled to the litter 26 and thereby supported by the base 24. A first side rail 30 is positioned at a right head end of the litter 26. A second side rail 32 is positioned at a right foot end of the litter 26. A third side rail 34 is positioned at a left head end of the litter 26. A fourth side rail 36 is positioned at a left foot end of the litter 26. If the patient support apparatus 20 is a stretcher or a cot, there may be fewer side rails. The side rails 30, 32, 34, 36 are movable between a raised position in which they block ingress and egress into and out of the patient support apparatus 20 and a lowered position in which they are not an obstacle to such ingress and egress and/or one or more intermediate positions therebetween. In still other configurations, the patient support apparatus 20 may not include any side rails.

A headboard may be coupled to the litter 26. In other embodiments, the headboard may be coupled to other locations on the patient support apparatus 20, such as the base 24. In still other embodiments, the patient support apparatus 20 does not include the headboard.

Caregiver interfaces 38, such as handles, are shown integrated into side rails 30, 32, 34, 36 to facilitate movement of the patient support apparatus 20 over floor surfaces. Additional caregiver interfaces 38 may be integrated into the headboard and/or other components of the patient support apparatus 20. The caregiver interfaces 38 are graspable by the caregiver to manipulate the patient support apparatus 20 for movement. In other embodiments, the patient support apparatus 20 does not include caregiver interfaces 38.

It should be noted that in many of the figures described herein, certain components of the patient support apparatus 20 have been removed for convenience of description and ease of illustration.

Figure 2A:
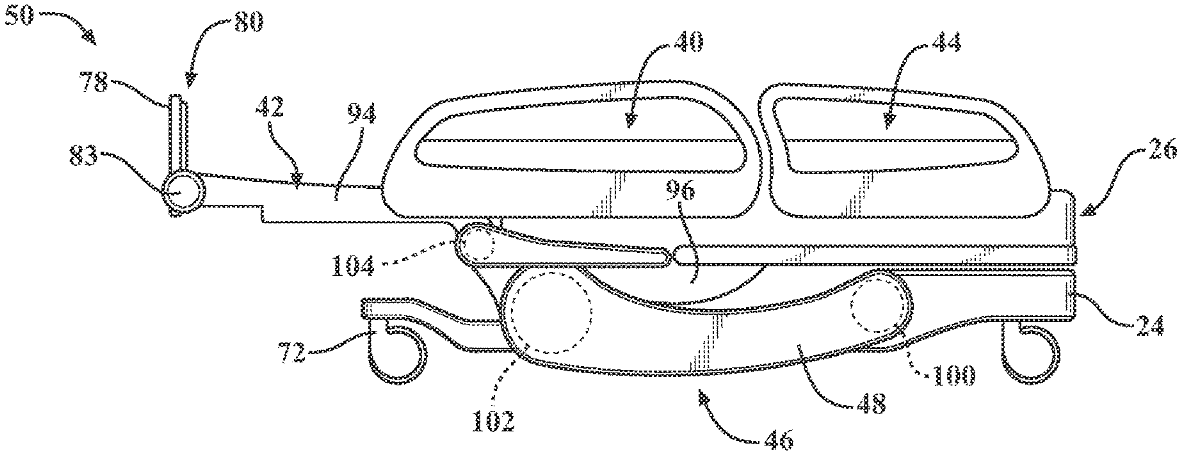
FIG. 2A is an elevational view of a litter in a first configuration.
Figure 2B:
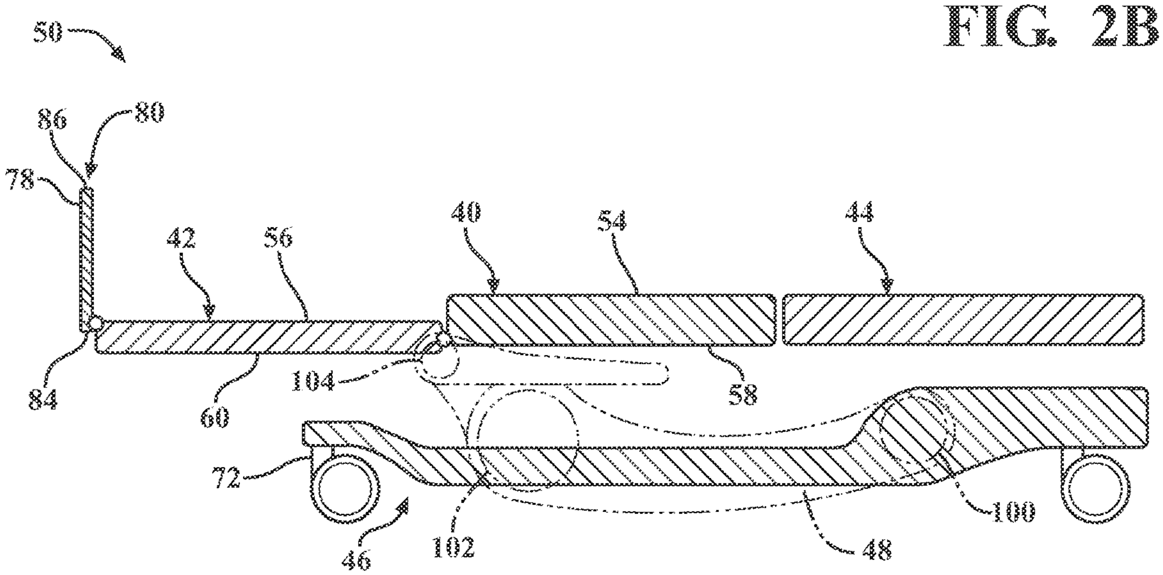
FIG. 2B is an elevational view illustrating a partial cross-section of FIG. 2A.

Referring to FIGS. 2A and 2B, the litter 26 comprises the seat section 40 and the foot section 42 coupled to the seat section 40. In many embodiments, the litter 26 further comprises the fowler section 44 coupled to the seat section 40 such that the seat section 40 is between the foot and fowler sections 42, 44. The patient support apparatus 20 comprises a lift system 46 coupled to the litter 26 and the base 24. The lift system 46 comprises a pair of lift members 48 coupling the litter 26 to the base 24. The lift system 46 is configured to move the litter 26 relative to the base 24.

The foot section 42 is configured and arranged to articulate relative to the seat section 40 between a first configuration 50 (shown in FIGS. 2A and 2B) in which the seat, foot, and fowler sections 40, 42, 44 are aligned generally horizontally above a floor surface and a second configuration 52 (shown in FIGS. 3A and 3B) in which the foot section 42 is stowed beneath the seat section 40 between the pair of lift members 48 and the fowler section 44 is raised relative to the seat section 40. The lift members 48 are arranged such that the lift members 48 do not impede movement (e.g. articulation) of the foot section 42 relative to the seat section 40 when the litter 26 is in the first configuration 50, the second configuration 52, and every configuration between the first and second configurations 50, 52. Further, the foot section 42 is configured to move between the lift members 48 when the litter 26 moves from the first configuration 50 to the second configuration 52. It should be appreciated that the patient support apparatus 20 may comprise one or more sections disposed between and configured to articulate relative to the seat section 40 and the foot section 42.

In one embodiment, shown in FIG. 14C and discussed in more detail below, the foot section 42 comprises one or more sections configured and arranged to articulate relative to each other.

The litter 26 has at least one intermediate configuration between the first and second configurations 50, 52. In one embodiment, the intermediate configuration is a bed exit configuration with the seat and foot sections 40, 42 tilted forward such that a patient may exit the bed toward the foot section 42. This position is helpful for patients having limited mobility to regain their lost mobility. Another embodiment of the intermediate configuration is shown in FIGS. 5A and 5B in which the seat section 40 is tilted so that the patient is somewhat limited in being able to easily exit yet still be placed in a seated position.

Figure 3A:
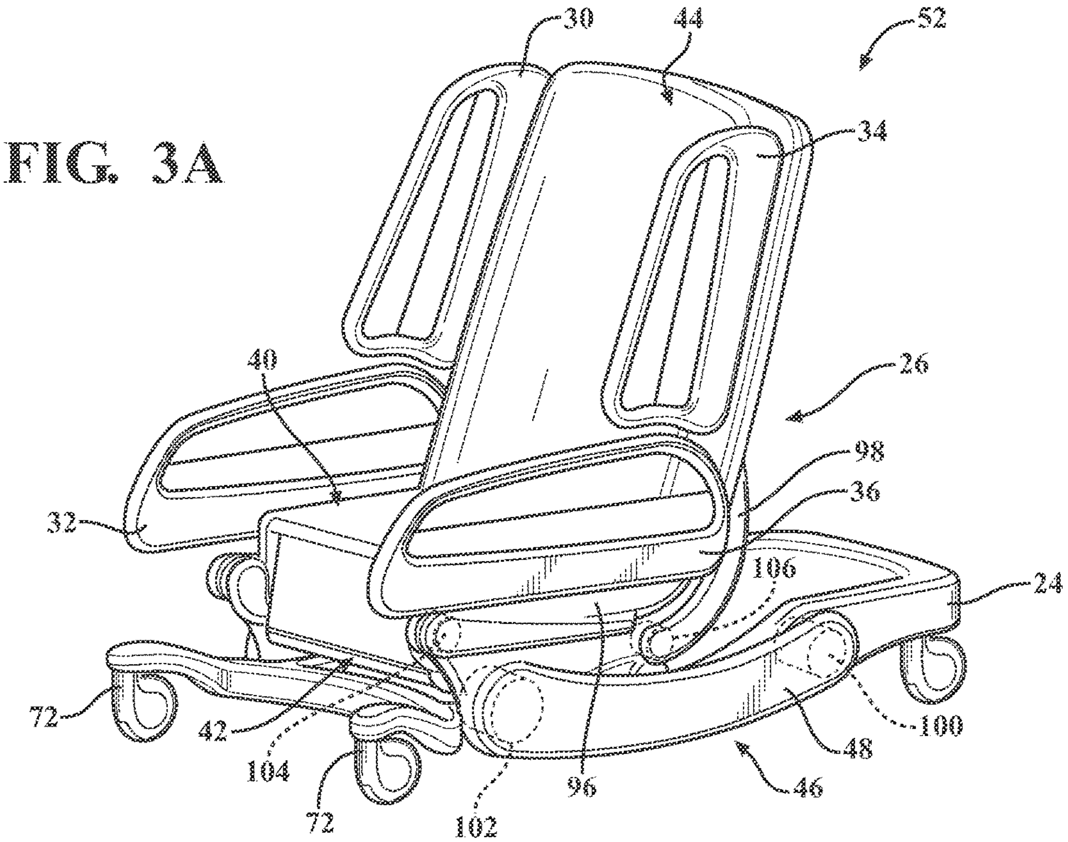
FIG. 3A is a perspective view of the litter in a second configuration.

In one embodiment as shown in FIGS. 3A and 3B, the second configuration 52 is a chair configuration. In another embodiment, the first configuration and the second configuration are any two distinct configurations of the litter 26. The foot section 42 rotates or otherwise articulates relative to the seat section 40 when the litter 26 moves between the first configuration 50 and the second configuration 52.

Referring specifically to FIG. 3B, the seat section 40 and the foot section 42 each define a top surface 54, 56, respectively, and bottom surfaces 58, 60 opposite the top surfaces 54, 56. In the first configuration 50, the top surfaces 54, 56 face away from the base 24. The bottom surface 60 of the foot section 42 faces the bottom surface 58 of the seat section 40 when the litter 26 is in the second configuration 52.

In one embodiment shown in FIG. 4, the foot section 42 comprises a first width 62. The pair of lift members 48 are spaced apart at a second width 64 greater than the first width 62 so that the foot section 42 is movable between the lift members 48. The foot section 42 is configured to be stowed beneath the seat section 40 and between the lift members 48 when moving from the first configuration 50 to the second configuration 52.

In one embodiment, the seat section 40 comprises a third width 66 that is greater than the first width 62. In one embodiment, the first width 62 is less than thirty-five inches. In other embodiments, the first width 62 is greater than or equal to thirty-five inches.

The base 24 comprises a foot end 68 and a head end 70. The base 24 further comprises at least two foot end support features 72 disposed at the foot end 68 to support the base 24 on the floor surface. In one embodiment, the foot end support features 72 comprise a pair of arms extending from the base with a caster wheel coupled to each arm for engagement with the floor surface.

In one embodiment, when the litter 26 is in the second configuration 52, the foot section 42 is beneath the seat section 40 and the foot end support features 72 are arranged with respect to the seat section 40 such that a patient's legs and feet hanging off the edge of the seat section 40 would not contact the foot end support features 72, but instead could reach the floor surface directly between the foot end support features 72. The base 24 defines an open space 74 between the foot end support features 72. The open space 74 is configured to be open to the floor surface between the foot end support features 72 and to receive feet of the patient between the foot end support features 72 when the litter 26 is in the second configuration 52. In other embodiments, not shown, the foot end support features 72 may be located directly beneath the seat section 40 such that the foot end support features 72 are not an obstacle to the patient when attempting to exit.

As shown in FIG. 4, the foot end support features 72 comprise an accommodation width 76. The accommodation width 76 is greater than the first width 62. Said differently, the foot end support features 72 are spaced apart to be wider than the width of the foot section 42 so that the foot section 42 may freely move between the foot end support features 72. The foot section 42 is configured to move at least partially within the open space 74 between the foot end support features 72 when the foot section 42 moves between the first configuration 50 and the second configuration 52.

Figure 6A:
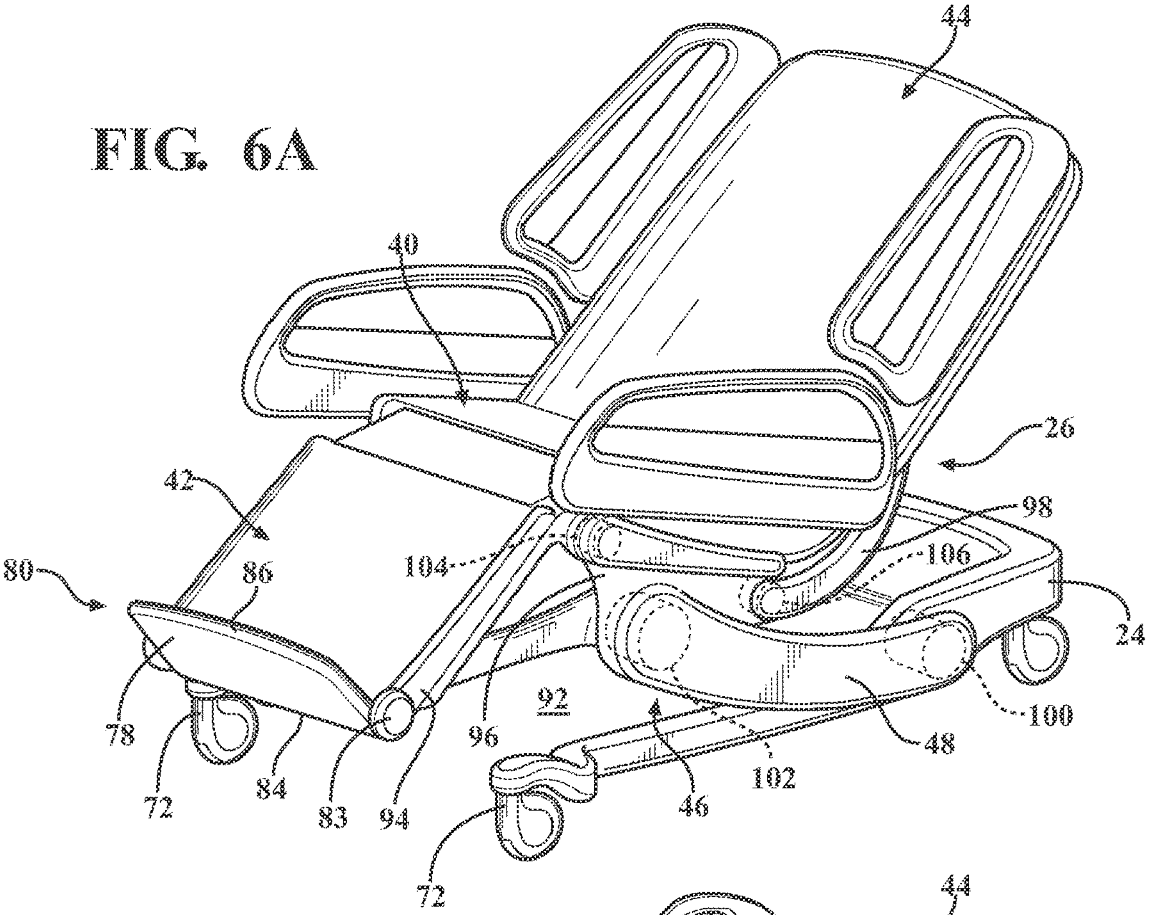
FIG. 6A is a perspective view of the litter supported by an alternative embodiment of the base.
Figure 6B:
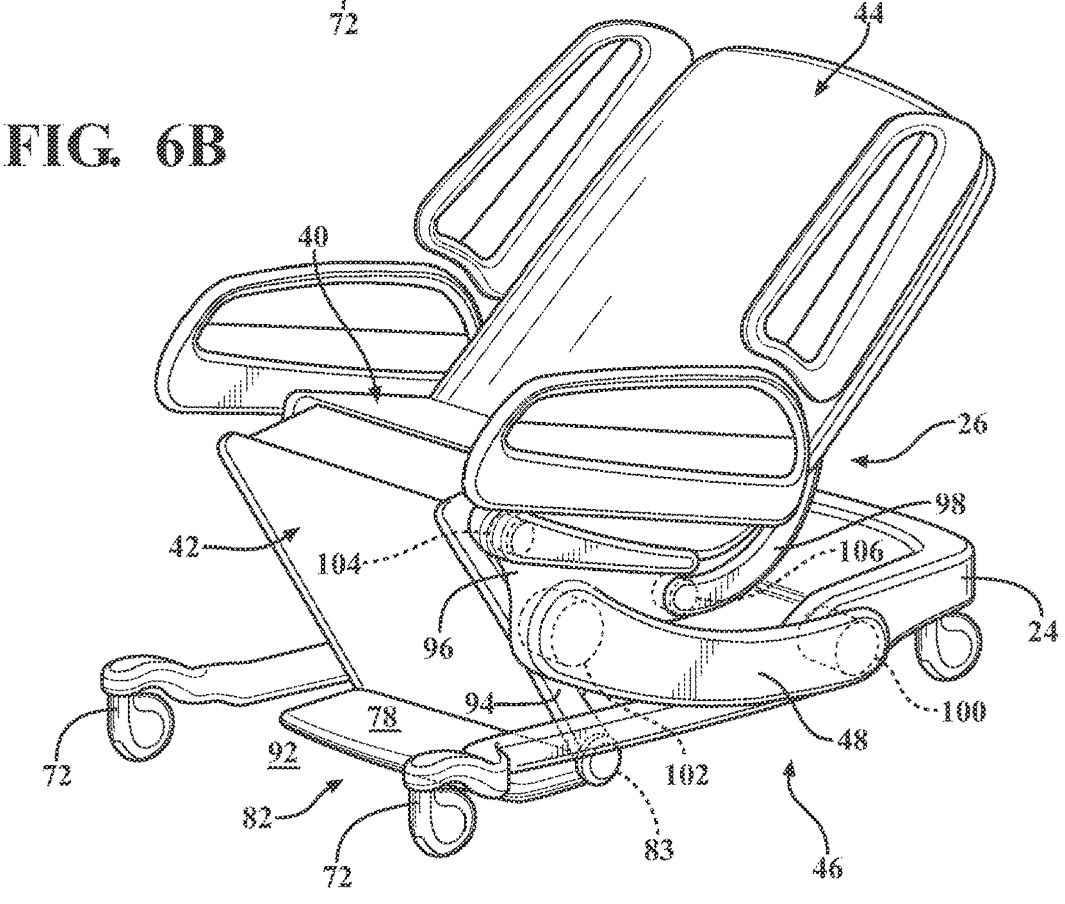
FIG. 6B is a perspective view illustrating the litter in another intermediate configuration.

In one embodiment, referring to FIGS. 6A and 6B, the patient support apparatus 20 further comprises a footboard 78 movably coupled to the foot section 42. The foot section 42 is disposed between the seat section 40 and the footboard 78. The footboard 78 is movable with the foot section 42 between the first configuration 50 and the second configuration 52. The footboard 78 is also movable relative to the foot section 42 between a deployed position 80 in which the footboard 78 defines a barrier with respect to the foot section 42 and a collapsed position 82 in which the footboard 78 is collapsed with respect to the foot section 42. In the deployed position, the barrier serves to prevent the patient from exiting the patient support apparatus 20 from the foot end. The footboard 78 is biased into the deployed position 80 by a biasing device 83. In some embodiments, as shown in FIGS. 14A-14D, the patient support apparatus 20 does not comprise a footboard 78.

In one embodiment, the biasing device 83 may comprise one or more tension springs, or other types of biasing devices (such as compression springs, gas springs, torsion springs, and the like). The footboard 78 is orthogonal to the foot section 42 in the deployed position 80. In alternative embodiments, the footboard 78 is in the deployed position 80 when the footboard 78 is at an angle greater than ninety degrees relative to the foot section 42. In further embodiments, the footboard 78 is in the deployed position 80 when the footboard 78 is at an angle less than ninety degrees relative to the foot section 42. The angle of the footboard 78 relative to the foot section 42 in the collapsed position 82 is less than the angle of the footboard 78 relative to the foot section 42 in the deployed position 80. The footboard 78 comprises a proximal end 84 coupled to the foot section 42 and a distal end 86 opposite the proximal end 84. The footboard 78 is configured to rotate or otherwise articulate relative to the foot section 42 such that the distal end 86 of the footboard 78 rotates toward the foot section 42. The distal end 86 of the footboard 78 is configured to make contact with the foot section 42, or at least a portion of the mattress 29 disposed on the foot section 42, when the footboard 78 is in the collapsed position 82.

The footboard 78 may be configured to rotate or otherwise articulate relative to the foot section 42 in a range of about ninety degrees, greater than ninety degrees, greater than one hundred eighty degrees, and/or greater than two hundred seventy degrees. For instance, the footboard 78 may articulate from its deployed position toward the mattress 29 to achieve between zero and ninety degrees of rotation, but additionally, or alternatively, may be configured to articulate from its deployed position away from the mattress 29. In the latter case, the footboard 78 may articulate until the footboard 78 is parallel with the foot section 42, e.g., it has been rotated about ninety degrees in a direction opposite the mattress 29 to be disposed one hundred eighty degrees from the foot section 42. Moreover, the footboard 78 may be configured to further rotate beyond one hundred eighty degrees and back toward the foot section 42, albeit now toward the bottom surface of the foot section 42.

In some embodiments, the footboard 78 is at an angle less than ninety degrees relative to the foot section 42 when the footboard 78 is in the collapsed position 82 and the distal end 86 of the footboard 78 does not make contact with the foot section 42 or the mattress 29 disposed on the foot section 42. In other words, the collapsed position 82, as shown for instance in FIG. 6B is any position to which the footboard 78 has moved toward the foot section 42 away from the deployed position 80.

In one embodiment, the mattress 29 is configured to move with the foot section 42 between the first and second configurations 50, 52. The footboard 78 is configured to trap bedding disposed on the mattress 29 against the mattress 29 when the footboard 78 is in the collapsed position 82. In some embodiments, the footboard 78 is able to trap bedding disposed on the mattress 29 in a position between the deployed and collapsed position 80, 82. Bedding may include sheets, blankets, comforters, covers, or any other bedding material conventionally used with mattresses.

In one embodiment shown in FIGS. 5A and 5B, the base 24 is configured to receive the footboard 78 when the litter 26 is moved to the second configuration 52. The base 24 may comprise a receiving space 88 to receive at least one of the footboard 78 and the foot section 42 when the sections 40, 42 are in the second configuration 52 such that at least one of the footboard 78 and foot section 42 at least partially nest with the base 24. The base 24 comprises an actuation surface 90 configured to engage the footboard 78 and move the footboard 78 from the deployed position 80 to the collapsed position 82 when the foot section 42 moves to the second configuration 52. In one embodiment, the receiving space 88 is recessed into the base 24. In an alternative embodiment, the receiving space 88 is a cutout in the base 24 that is open to the floor surface.

In other embodiments as shown in FIGS. 6A and 6B, the base 24 comprises an actuation opening 92 that is open to the floor surface. The foot section 42 may freely move within the actuation opening 92 and the floor surface engages the footboard 78 to move the footboard 78 from the deployed position 80 to the collapsed position 82. In many embodiments, the footboard 78 is arranged to be in the collapsed position 82 when the litter 26 is in the second configuration 52. However, the footboard 78 may be arranged in any suitable manner relative to the foot section 42 when the litter 26 is in the second configuration 52. For instance, the footboard 78 may remain in its deployed orientation relative to the foot section 42 (e.g., generally orthogonal to the foot section 42), the footboard 78 may be directed toward a head end of the patient support apparatus 20, the footboard 78 may be directed toward a foot end of the patient support apparatus 20, or the footboard 78 may be oriented in any other suitable orientation when the litter 26 is in the second configuration 52.

The footboard 78 is configured to abut one of the actuation surface 90 and the floor surface when the foot section 42 is moved to the second configuration 52 such that an actuation force is applied by one of the actuation surface 90 and the floor surface on the footboard 78 against a biasing force from the biasing device 83 to move the footboard 78 from the deployed position 80 to the collapsed position 82. In one embodiment, the footboard 78 is configured to abut one of the actuation surface 90 and the floor surface when the foot section 42 is vertically oriented relative to the floor surface to begin moving the footboard 78 from the deployed position 80 to the collapsed position 82. In other embodiments, the footboard 78 is configured to abut one of the actuation surface 90 and the floor surface when the foot section 42 is non-vertically oriented relative to the floor surface to begin moving the footboard 78 from the deployed position 80 to the collapsed position 82.

As shown in FIGS. 7A and 7B, the lift system 46 comprises a first actuator 100 coupled to one of the lift members 48 and the base 24 at an end of the lift member 48 coupled to the base 24. The first actuator 100 pivots the pair of lift members 48 relative to the base 24 and moves the litter 26 relative to the base 24. The first actuator 100 is hereinafter referred to as the lift actuator 100. In some cases a rigid link (e.g., connecting shaft) interconnects the lift members 48 at their ends coupled to the base 24 so that operation of the lift actuator 100 simultaneously moves both of the lift members 48. In other embodiments, separate actuators for each lift member 48 are employed.

In one embodiment, the lift actuator 100 is a rotary actuator as described in one of U.S. Non-Provisional application Ser. No. 15/635,787, entitled PATIENT SUPPORT SYSTEMS WITH ROTARY ACTUATORS, filed on Jun. 28, 2017; U.S. Non-Provisional Application Ser. No. 15/635,836, entitled PATIENT SUPPORT SYSTEMS WITH ROTARY ACTUATORS COMPRISING ROTATION LIMITING DEVICES, filed on Jun. 28, 2017; U.S. Non-Provisional application Ser. No. 15/635,802, entitled PATIENT SUPPORT SYSTEMS WITH HOLLOW ROTARY ACTUATORS, filed on Jun. 28, 2017; U.S. Non-Provisional application Ser. No. 15/635,826, entitled PATIENT SUPPORT SYSTEMS WITH ROTARY ACTUATORS HAVING CYCLOIDAL DRIVES, filed on Jun. 28, 2017; and U.S. Non-Provisional application Ser. No. 15/635,817, entitled ROTARY ACTUATOR HAVING CLUTCH ASSEMBLY FOR USE WITH PATIENT SUPPORT APPARATUS, filed on Jun. 28, 2017, each of which is hereby incorporated by reference in its entirety. In this embodiment, the lift members 48 are movable members and the lift actuator 100 drives relative movement between the lift members 48 and the base 24 to articulate (e.g., pivot) the lift members 48 relative to the base 24. In this manner, the litter 26 is raised relative to the base 24. The lift actuator 100 comprises a motor (not shown) to provide power for the lift actuator 100 to drive the lift actuator 100 in a forward driving condition. In other embodiments, the lift actuator 100 is a linear actuator or other actuators are also contemplated.

The lift system 46 further comprises a second actuator 102 coupled to one of the lift members 48 and a seat section support frame 96 of the seat section 40. In particular, the second actuator 102 is coupled to the lift member 48 at an end of the lift member 48 coupled to the seat support frame 96. The second actuator 102 moves the seat section 40 relative to the pair of lift members 48 and tilts the seat section 40 and the litter 26 relative to the base 24. The second actuator 102 is hereinafter referred to as the tilt actuator 102.

Figure 7C:
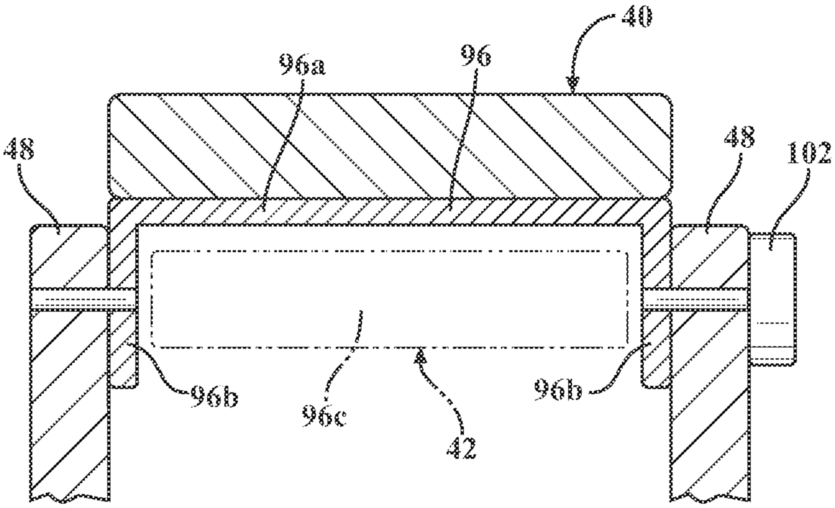
FIG. 7C is an elevational cross section view of the patient support apparatus in the second configuration of FIG. 3A.

Referring to FIG. 7C, the seat section support frame 96 comprises a seat support frame base **96*a* disposed between two seat support frame plates 96*b*. The seat support frame plates 96*b* are coupled to the lift members 48 and the tilt actuator 102. In one embodiment, the seat support frame base 96*a* and the seat support frame plates 96*b* are one continuous piece. In other embodiments, the seat support frame base 96*a* and the seat support frame plates 96*b*** comprise multiple components coupled together.

In one embodiment, the seat support frame plates **96*b* extend from the seat support frame base 96*a* toward the floor space to define a seat support frame interior 96*c*. In one embodiment, the seat support frame interior 96*c* receives the foot section 42 when the litter 26 is in the second configuration 52. In another embodiment, the foot section 42 is underneath the seat support frame base 96*a* when the litter 26 is in the second configuration 52**.

In one embodiment, the tilt actuator 102 is a rotary actuator as described in one of the above identified U.S. Non-Provisional Applications incorporated by reference. In this embodiment, the seat support frame 96 is a movable member and the tilt actuator 102 drives relative movement between the seat support frame 96 and the lift members 48 to articulate the seat support frame 96 relative to the lift members 48. In this manner, the litter 26 is tilted relative to the base 24. The tilt actuator 102 comprises a motor (not shown) to provide power for the tilt actuator 102 to drive the tilt actuator 102 in a forward driving condition. In other embodiments, the tilt actuator 102 is a linear actuator or other actuators are also contemplated.

In one embodiment, the lift system 46 comprises exactly two lift members 48. The arrangement of two actuators 100, 102 on either end of the lift members 48 eliminates the need for additional support arms or members. Further, with the lift and tilt actuators 100, 102 driving and constraining movement of the lift members 48 relative to the base 24 and the seat support frame 96, respectively, there is no need for timing mechanisms such as four bar mechanisms or other timing mechanisms to stabilize the lift system 46.

In one embodiment, the lift and tilt actuators 100, 102 are not back drivable. Back drive occurs when a load is applied externally to the respective movable members of the lift and tilt actuators 100, 102, which creates torque in opposition to drive torque provided by the motor, that, if not checked, would otherwise rotate (in an opposite direction to the respective forward driving conditions of the lift and tilt actuators 100, 102)

A third actuator 104 is coupled to a foot section support frame 94 of the foot section 42 and the seat section support frame 96. The third actuator 104 is arranged to move (e.g., articulate) the foot section 42 relative to the seat section 40. The third actuator 104 is hereinafter referred to as the foot section actuator 104.

In one embodiment, the foot section actuator 104 is a rotary actuator as described in one of the above identified U.S. Non-Provisional Applications incorporated by reference. In this embodiment, the foot section support frame 94 is a movable member and the foot section actuator 104 drives relative movement between the seat section support frame 96 and the foot section support frame 94 to articulate the foot section support frame 94 relative to the seat section support frame 96. In this manner, the foot section 42 may be moved (e.g. articulated) beneath the seat section 40. In other embodiments, the foot section actuator 104 is a linear actuator or other actuators are also contemplated.

A fourth actuator 106 is coupled to a fowler section support frame 98 of the fowler section 44 and the seat section support frame 96. The fourth actuator 106 is arranged to move (e.g., articulate) the fowler section 44 relative to the seat section 40. The fourth actuator 106 is hereinafter referred to as the fowler section actuator 106.

In one embodiment, the fowler section actuator 106 is a rotary actuator as described in one of the above identified U.S. Non-Provisional Applications incorporated by reference. In this embodiment, the fowler section support frame 98 is a movable member and the fowler section actuator 106 drives relative movement between the fowler section support frame 98 and the seat section support frame 96 to articulate the fowler section support frame 98 relative to the seat section support frame 96. In other embodiments, the fowler section actuator 106 is a linear actuator or other actuators are also contemplated.

Figure 8:
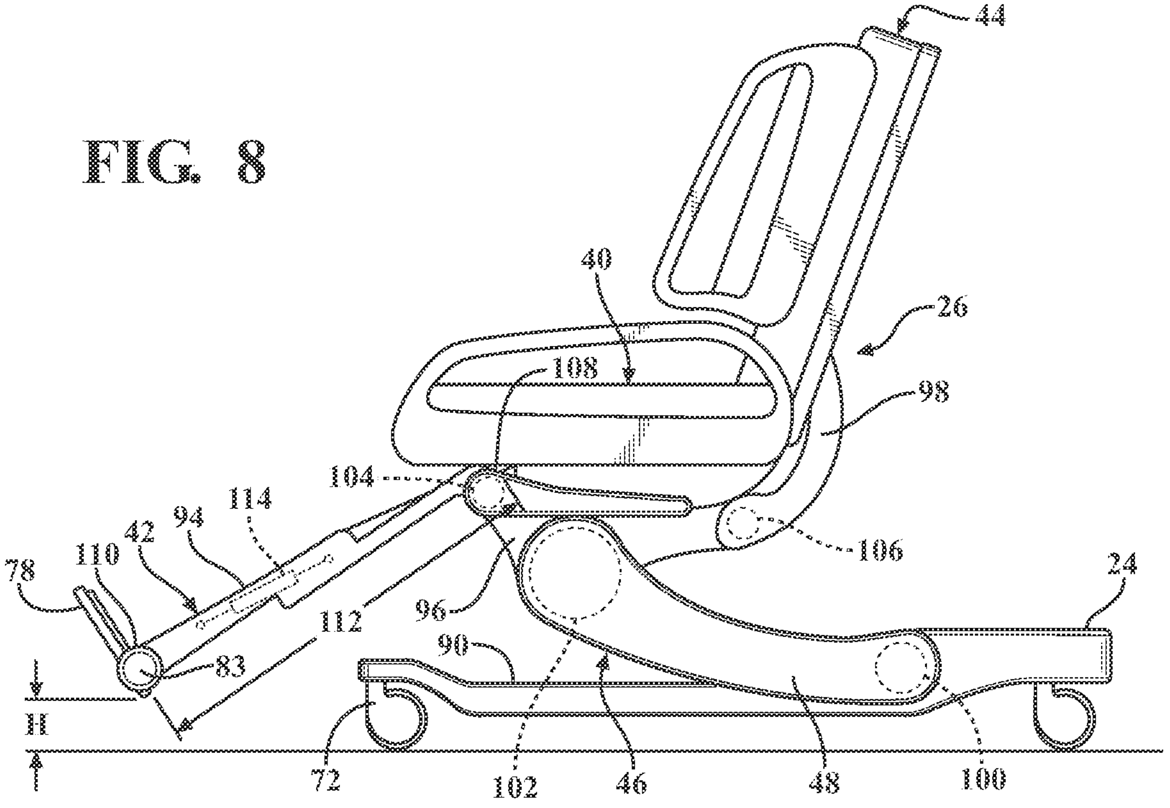
FIG. 8 is an elevational view illustrating a foot section of the litter being in a fully extended position.
Figure 9:
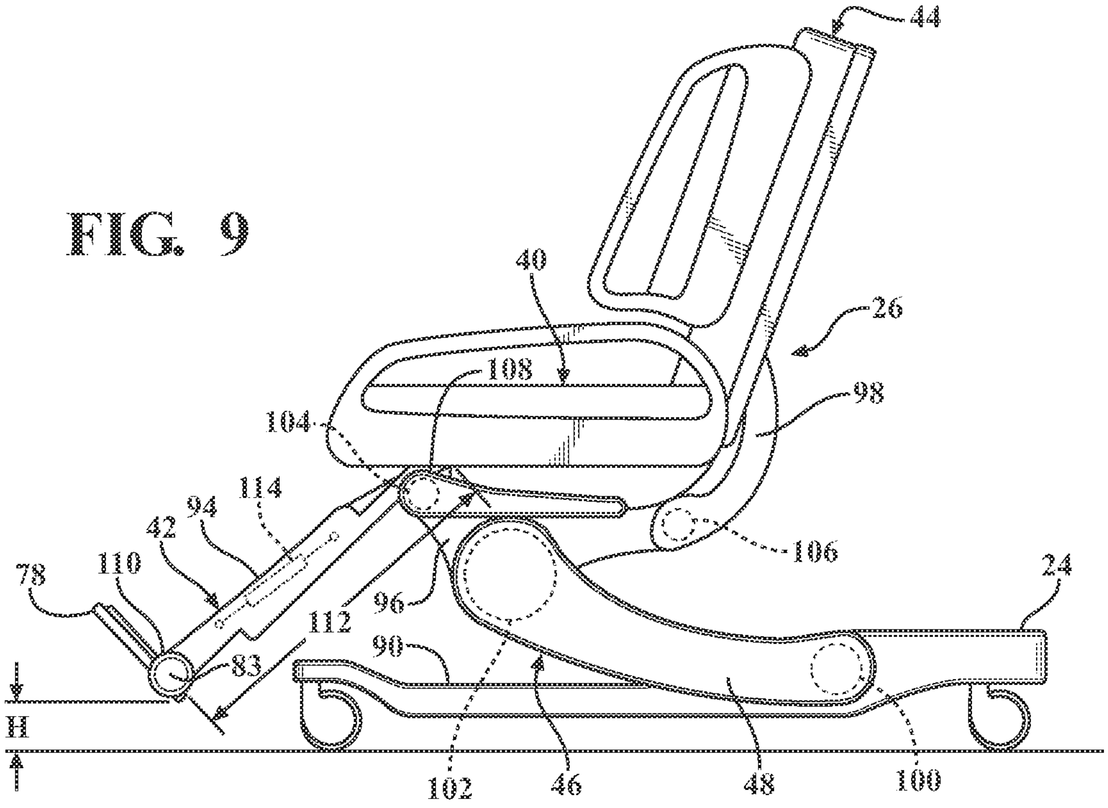
FIG. 9 is an elevational view illustrating the foot section of the litter being in an intermediate position between the fully extended position and a fully retracted position.
Figure 10:
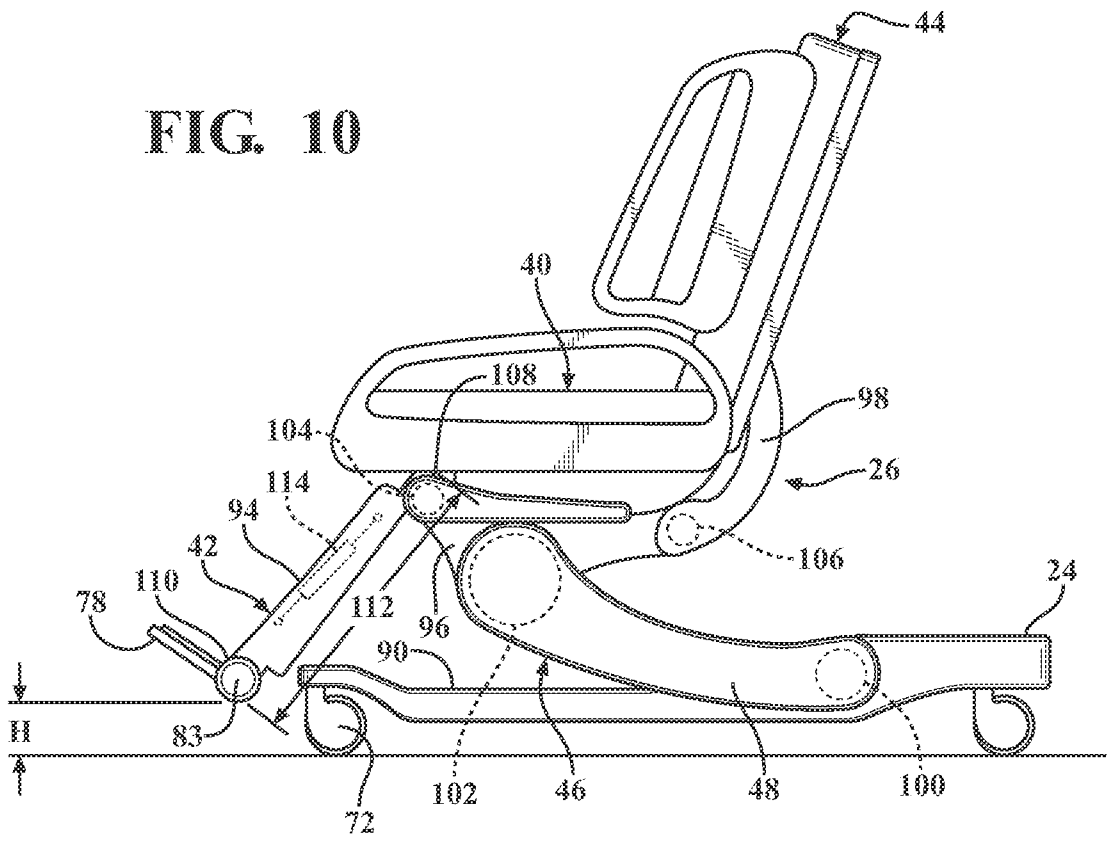
FIG. 10 is an elevational view illustrating the foot section of the litter being in a fully retracted position.

In one embodiment, as shown in FIGS. 8-10, the foot section support frame 94 comprises a proximal end 108 coupled to the seat section 40, a distal end 110 coupled to the footboard 78, and a length 112 between the proximal end 108 and the distal end 110. In one embodiment, the foot section support frame 94 is extendable relative to the seat section 40 such that the foot section support frame length 112 may be increased or decreased. FIGS. 8-10 show a progression of the foot section 42 extended and retracted.

In another embodiment, shown in FIG. 14C and described further below, the foot section 42 comprises multiple sections and the multiple sections may be articulated relative to each other such that the foot section 42 may be extended or retracted to adjust a length of the foot section 42.

In the embodiments described in the figures, one actuator is shown for each of the lift, tilt, foot section, and fowler section actuators 100, 102, 104, 106. In alternative embodiments, two or more actuators may be employed for each of the lift, tilt, foot section, and fowler section actuators 100, 102, 104, 106.

A fifth actuator 114 is coupled to the foot section 42 that extends and retracts the foot section support frame 94. The fifth actuator 114 is hereinafter referred to as the extension actuator 114. In the embodiments described in the figures, one actuator is shown for the extension actuator 114. In alternative embodiments, two or more actuators may be employed for the extension actuator 114.

As shown in FIGS. 8-10, the extension actuator is a linear actuator. The foot section support frame 94 comprises a first frame integral with the proximal end 108 and coupled to the seat section 40 and a second frame integral with the distal end 110 and coupled to the footboard 78. The second frame is movable relative to the first frame to extend the foot section support frame length 112. In this embodiment, the second frame is a movable member and the extension actuator 114 drives relative movement between the first and second frames to move the first frame relative to the second frame thus, the footboard 78 relative to the seat section support frame 96. In other embodiments, the extension actuator 114 is a rotary actuator as described in one of the above identified U.S. Non-Provisional Applications or other actuators are also contemplated. In some cases, if a rotary actuator is used in place of a linear actuator, a mechanical apparatus may additionally be employed to translate rotary movement from the rotary actuator to linear movement to move the first and second frames relative to each other to extend and retract the foot section 42 as desired. The mechanical apparatus may have a rack and pinion configuration, a lead screw configuration, or any other mechanical configuration known in the art to translate rotational movement to linear movement.

The foot section actuator 104 and the extension actuator 114 collectively form a foot section actuator system 116, while the foot section actuator system 116 and the fowler section actuator 106 collectively form an articulation system 49.

In another embodiment, instead of a biasing device 83 being used to bias the footboard 78 into the deployed position 80, the articulation system 49 further comprises a footboard actuator 117 (shown schematically in FIG. 11) coupled to the proximal end 84 of the footboard 78 and configured to move the footboard 78 from the deployed position 80 to the collapsed position 82.

In one embodiment, the footboard actuator 117 is a rotary actuator as described in one of the above identified U.S. Non-Provisional Applications incorporated by reference. In this embodiment, the footboard 78 is a movable member and the footboard actuator 117 drives relative movement between the footboard 78 and the foot section support frame 94 to articulate the footboard 78 relative to the foot section support frame 94. In other embodiments, the footboard actuator 117 is a linear actuator or other actuators are also contemplated.

Several embodiments illustrating arrangements of the sections of the litter 26 are shown in FIGS. 14A-14E and described below. Embodiments shown in FIGS. 14A-14D do not include the footboard 78, however, it is appreciated that the footboard 78 could be coupled to the foot section 42 as described in the above embodiments. Lift members 48 are shown in hidden lines for ease of illustrating the sections of the litter 26.

In embodiments shown in FIG. 14A-14C, an additional section, hereinafter referred to as a leg section 160, is disposed between the foot section 42 and the seat section 40. The leg section 160 comprises a leg section support frame 162. A leg section actuator 164, is coupled to the seat support frame 96 and the leg section support frame 162. The leg section actuator 164 is arranged to move (e.g. articulate) the leg section 160 relative to the seat section 40. The foot section actuator 104 is coupled to the leg section support frame 162 and the foot section support frame 94. The foot section actuator 104 is configured to move (e.g. articulate) the foot section 42 relative to the leg section 160.

In one embodiment, the leg section actuator 164 is a rotary actuator as described in one of the above identified U.S. Non-Provisional Applications incorporated by reference. In this embodiment, the leg section support frame 162 is a movable member and the leg section actuator 164 drives relative movement between the seat section support frame 96 and the leg section support frame 162 to articulate the leg section support frame 162 relative to the seat section support frame 96. In this manner, the leg section 160 may be moved (e.g. articulated) beneath the seat section 40. In other embodiments, the leg section actuator 164 is a linear actuator or other actuators are also contemplated.

Figure 14A:
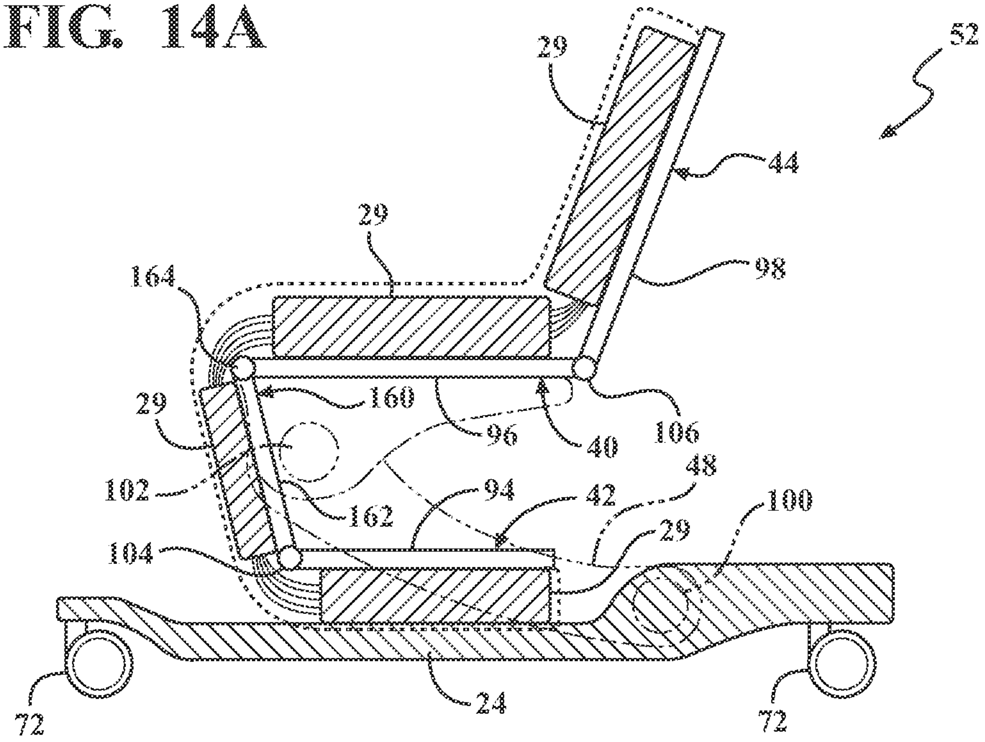
FIG. 14A is an elevational and partially cross-sectional view of another configuration of sections of the litter.
Figure 14B:
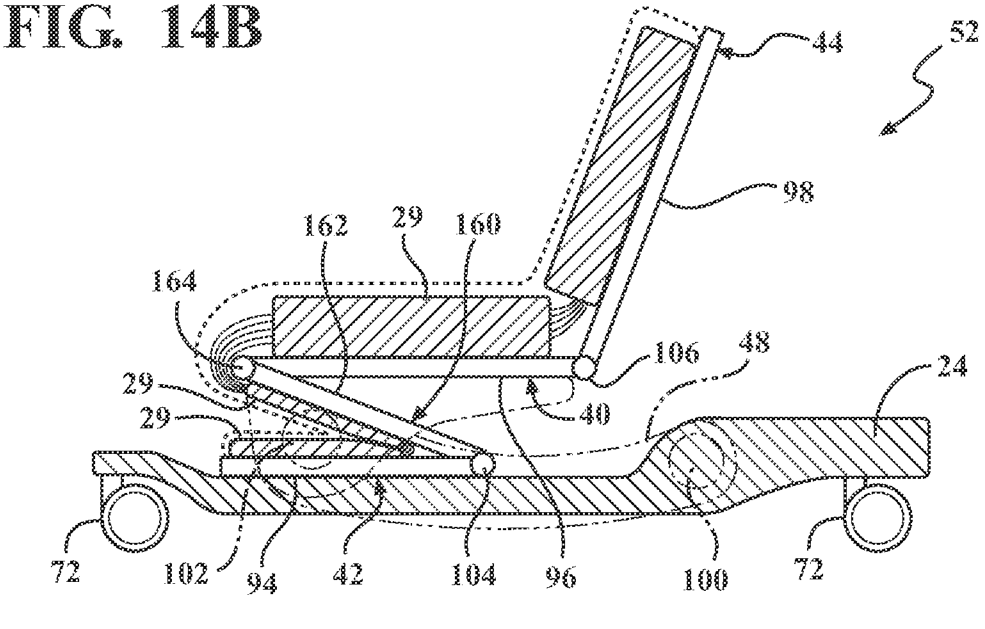
FIG. 14B is an elevational and partially cross-sectional view of a further configuration of the sections of the litter.
Figure 14C:
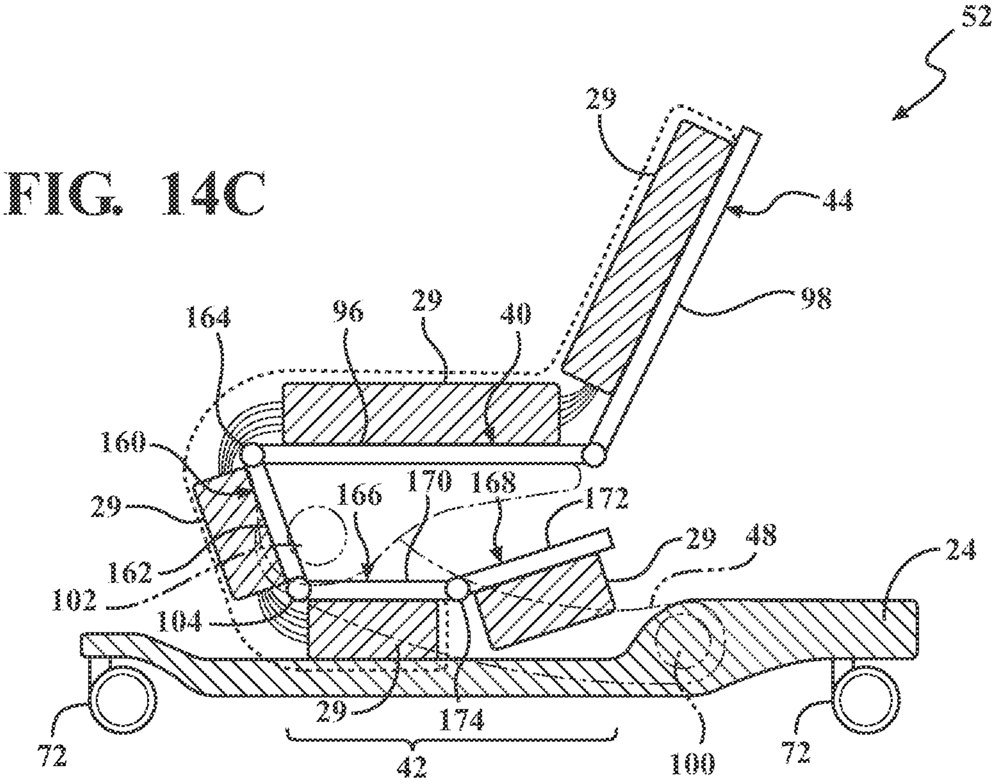
FIG. 14C is an elevational and partially cross-sectional view of a further configuration of the sections of the litter.

In the embodiment illustrated in FIG. 14C, the foot section 42 comprises a first foot section 166 and a second foot section 168. The foot section support frame 94 comprises a first foot section support frame 170 corresponding to the first foot section 166 and a second foot section support frame 172 coupled to the first foot section support frame 170 and corresponding to the second foot section 168. Foot section actuator 104 is coupled to the leg section support frame 162 and the first foot section support frame 170. The foot section actuator 104 is arranged to move (e.g. articulate) the first foot section 166 relative to the leg section 160. An intermediate foot section actuator 174 (also referred to as an extension actuator) is coupled to the first foot section support frame 170 and the second foot section support frame 172. The intermediate foot section actuator 174 is arranged to move (e.g. articulate) the second foot section 168 relative to the first foot section 166. In some embodiments, as alluded to above, the intermediate foot section actuator 174 is arranged to move (e.g. articulate) the second foot section 168 relative to the first foot section 166 to effectively extend and retract the foot section 42 to adjust the length of the foot section 42 during use in the first configuration. It should be appreciated that, in some embodiments, the leg section 160 could be considered part of the foot section 42.

In one embodiment, the intermediate foot section actuator 174 is a rotary actuator as described in one of the above identified U.S. Non-Provisional Applications incorporated by reference. In this embodiment, the second foot section support frame 172 is a movable member and the intermediate foot section actuator 174 drives relative movement between the first foot section support frame 170 and the second foot section support frame 172 to articulate the second foot section support frame 172 relative to the first foot section support frame 170. In other embodiments, the intermediate foot section actuator 174 is a linear actuator or other actuators are also contemplated.

Figure 11:
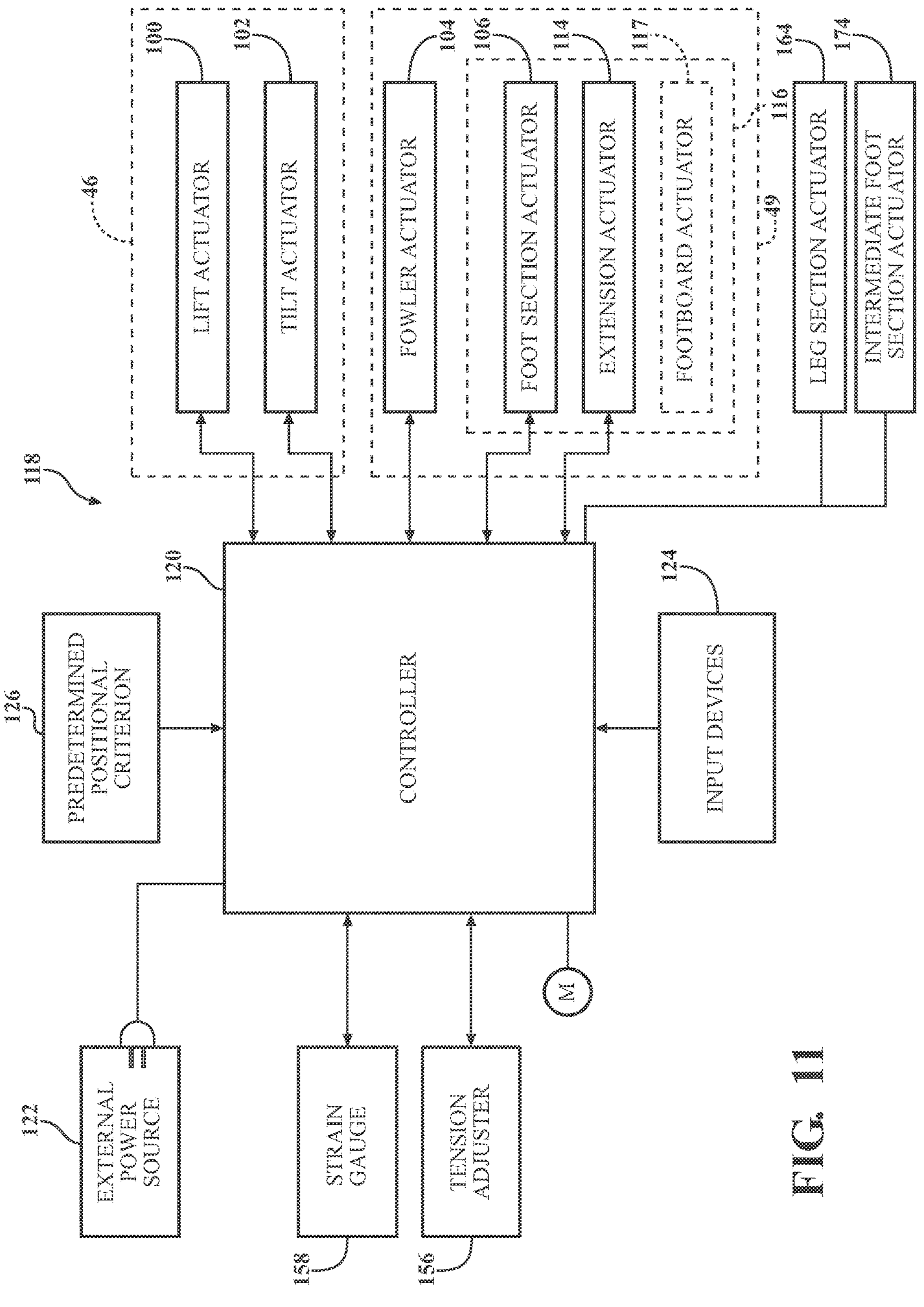
FIG. 11 is a schematic view of a control system for the patient support apparatus.

As shown in FIG. 11, a control system 118 is provided to control operation of the actuators 100, 102, 104, 106, 114, 117, 164, 174. The control system 118 comprises a controller 120 having one or more microprocessors for processing instructions or for processing an algorithm stored in memory to control operation of the actuators 100, 102, 104, 106, 114, 117, 164, 174. Additionally or alternatively, the controller 120 may comprise one or more microcontrollers, field programmable gate arrays, systems on a chip, discrete circuitry, and/or other suitable hardware, software, or firmware that is capable of carrying out the functions described herein. The controller 120 may be carried on-board the patient support apparatus 20, or may be remotely located. In one embodiment, the controller 120 is mounted to the base 24. The controller 120 may comprise one or more subcontrollers configured to control one or more actuators or one or more subcontrollers for each of the actuators 100, 102, 104, 106, 114, 117, 164, 174. Power to the actuators 100, 102, 104, 106, 114, 117, 164, 174 and/or the controller 120 may be provided by a battery power supply or an external power source 122.

The controller 120 is coupled to the actuators 100, 102, 104, 106, 114, 117, 164, 174 in a manner that allows the controller 120 to control the actuators 100, 102, 104, 106, 114, 117, 164, 174. The controller 120 may communicate with the actuators 100, 102, 104, 106, 114, 117, 164, 174 via wired or wireless connections. The controller 120 generates and transmits control signals to the actuators 100, 102, 104, 106, 114, 117, 164, 174, or otherwise cause the actuators to perform one or more of the desired functions.

The controller 120 controls operation of the actuators 100, 102, 104, 106, 114, 117, 164, 174. More specifically, the controller 120 may monitor a current state of the actuators 100, 102, 104, 106, 114, 117, 164, 174 and determine desired states in which the actuators 100, 102, 104, 106, 114, 117, 164, 174 should be placed, based on one or more input signals that the controller 120 receives from one or more user input devices 124. Alternatively, the controller 120 may monitor a position of the fowler section 44, seat section 40, leg section 160, foot section 42, and/or footboard 78 and determine desired positions of the fowler section 44, seat section 40, leg section 160, foot section 42, and/or footboard 78.

The caregiver, or other user, may actuate one of the user input devices 124, which transmits a corresponding input signal to the controller 120, and the controller 120 controls operation of the corresponding actuator based on the input signal. Operation of the corresponding actuator may continue until the caregiver discontinues actuation of the user input device 124, e.g., until the input signal is terminated. In other words, depending on which user input device 124 is engaged, i.e., what input signal is received by the controller 120, the controller 120 controls operation of one or more of the actuators 100, 102, 104, 106, 114, 117, 164, 174. In certain embodiments, the controller 120 selects or initiates operation of one or more of the actuators 100, 102, 104, 106, 114, 117, 164, 174 based on the input signals received by the controller 120.

The user input devices 124 may comprise devices capable of being actuated by a user, such as the caregiver or the patient. The user input devices 124 may be configured to be actuated in a variety of different ways, including but not limited to, mechanical actuation (hand, foot, finger, etc.), hands-free actuation (voice, foot, etc.), and the like. Each user input device 124 may comprise a button, a gesture sensing device for monitoring motion of hands, feet, or other body parts of the caregiver (such as through a camera), a microphone for receiving voice activation commands, a foot pedal, and a sensor (e.g., infrared sensor such as a light bar or light beam to sense a user's body part, ultrasonic sensor, etc.). Additionally, the buttons/pedals can be physical buttons/pedals or virtually implemented buttons/pedals such as through optical projection or on a touchscreen. It should be appreciated that any combination of user input devices 124 may also be utilized for any of the actuators. The user input devices 124 may be located on one of the side rails 30, 32, 34, 36, the headboard, the footboard 78, or other suitable locations. The user input devices 124 may also be located on a portable electronic device (e.g., iWatch®, iPhone®, iPad®, or similar electronic devices or any other remote device/station in addition to a portable electronic device).

In one embodiment, the patient support apparatus 20 comprises a user control panel that comprises numerous user input devices 124 in the form of buttons. The buttons may be mechanical press buttons, virtual buttons on a touch screen, and the like. Furthermore, as should be appreciated, the patient support apparatus may comprise any number of actuators and the corresponding user input devices 124. Each of the buttons control different predetermined functions of one or more of the actuators.

In order for the caregiver to continue operating one of the actuators 100, 102, 104, 106, 114, 117, 164, 174 to perform the desired function using one of the buttons (or other user input devices 124), the caregiver may be required to continue actuating (e.g., continue depressing or continue touching) the button until the caregiver is satisfied with the adjustment that was made to the actuator. Other user input devices 124 can be continually actuated in other ways, depending on their mode of actuation. For instance, an infrared sensor that generates a light beam can be continually actuated by continually breaking the light beam. Similarly, a gesture sensing device can be continually actuated by continually sensing an actuating gesture.

In some cases, this requirement that the caregiver continually actuate (e.g., continually depress or continually touch) the button (or other user input device 124) to cause energization of the actuator prevents the caregiver from performing other tasks that could be performed instead, such as assisting the patient with other needs. Accordingly, in certain embodiments described herein, the user input devices 124 are configured to also enable continued operation (i.e., energization) of the actuator, even after the caregiver ceases to actuate the user input device 124, e.g., after the caregiver ceases to depress or touch one of the buttons, for a predetermined period of time, or until the desired adjustment is complete.

As previously discussed, the user input devices 124, are capable of generating numerous input signals associated with one or more of the actuators 100, 102, 104, 106, 114, 117, 164, 174. For instance, each of the buttons generate a different first input signal associated with each of the different functions assigned to the buttons. The controller 120 is configured to recognize which input signal is being received so that the controller 120 can operate the actuators 100, 102, 104, 106, 114, 117, 164, 174 appropriately to perform the assigned functions.

In some embodiments, the controller 120 is configured to initiate operation of the lift system 46 in response to receiving the first input signal when the caregiver presses the button to operate the actuator to either lift or lower the litter 26.

In further embodiments, operation of the lift system 46 is dependent on a triggering event that causes the controller 120 to operate the lift system 46 to move the patient from a current patient condition (e.g., a current patient elevation) to a desired patient condition (e.g., a desired patient elevation).

Embodiments for controlling actuators 100, 102, 104, 106, 114, 117, 164, 174 to effect various configurations of the sections of the litter 26 when placing the litter 26 in the second configuration 52 are described below and illustrated in FIGS. 14A-14E. Additional configurations of the sections of the litter 26 are possible. In many embodiments, actuators 100, 102, 104, 106, 114, 117, 164, 174 are configured to articulate sections of the litter 26 in more than one direction relative to each other to effect a number of configurations of the sections of the litter 26.

In one embodiment, as shown in FIG. 14A, the controller 120 is configured to control articulation of the leg section 160 relative to the seat section 40 such that the leg section support frame 162 articulates away from the mattress 29 disposed on the seat section support frame 96. The controller 120 is configured to control articulation of the foot section 42 relative to the leg section 160 such that the foot section support frame 94 articulates away from the mattress 29 disposed on the leg section support frame 162. In a variation of that shown in FIG. 14A, the controller 120 could control the leg section actuator 164 to further rotate the leg section 160 toward the seat section 40, while the foot section 42 remains parallel to the leg section 160 or with the foot section 42 articulated in an opposite direction relative to the leg section 160.

In another embodiment, as shown in FIG. 14B, the controller 120 is configured to control articulation of the foot section 42 relative to the leg section 160 such that the foot section support frame 94 articulates toward the mattress 29 disposed on the leg section support frame 162 (e.g., the foot section 42 is folded toward the leg section 160). In some embodiments, the mattress 29 is configured to deflate or otherwise compress (as shown in FIG. 14B) to permit the foot section support frame 94 to articulate closer to the leg section support frame 162. In a variation of that shown in FIG. 14B, the controller 120 could be configured to operate the foot section actuator 104 to articulate the foot section 42 toward the leg section 160 but in the opposite direction to that shown in FIG. 14B such that the foot section 42 and the leg section 160 are similarly collapsed (e.g., folded) together, but bottom-to-bottom instead of mattress-to-mattress. In this version, the controller 120 would articulate the foot section 42 toward the leg section 160 prior to the leg section 160 being moved by the controller 120 to place the litter 26 in the second configuration 52.

In one embodiment, as shown in FIG. 14C, the controller 120 is configured to control articulation of the second foot section 168 relative to the first foot section 166 such that the second foot section support frame 172 articulates slightly away from the mattress 29 disposed on the first foot section support frame 170. In variations of that shown in FIG. 14C, the controller 120 could be configured to operate the intermediate foot section actuator 174 to fold the first foot section 166 and the second foot section 168 together (in either direction as described above) or to fold all of the first foot section 166, the second foot section 168, and the leg section 160 together in any manner.

Figure 14D:
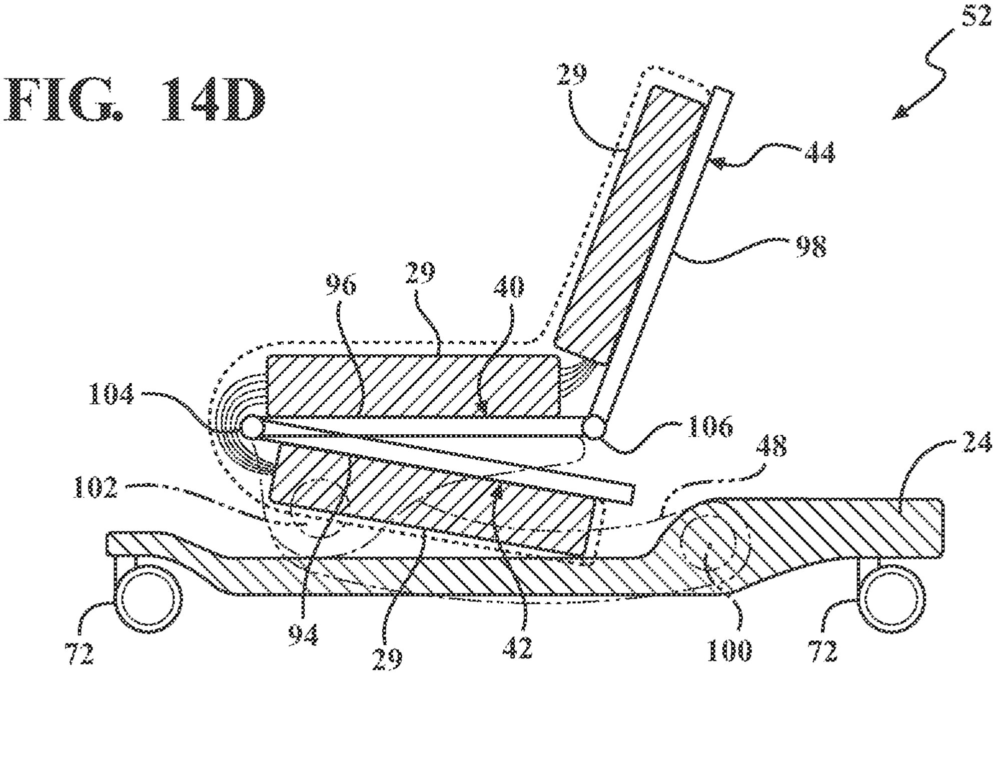
FIG. 14D is an elevational and partially cross-sectional view of a further configuration of the sections of the litter.

In one embodiment, as shown in FIG. 14D, the controller 120 is configured to control articulation of the foot section 42 relative to the seat section 40.

Figure 14E:
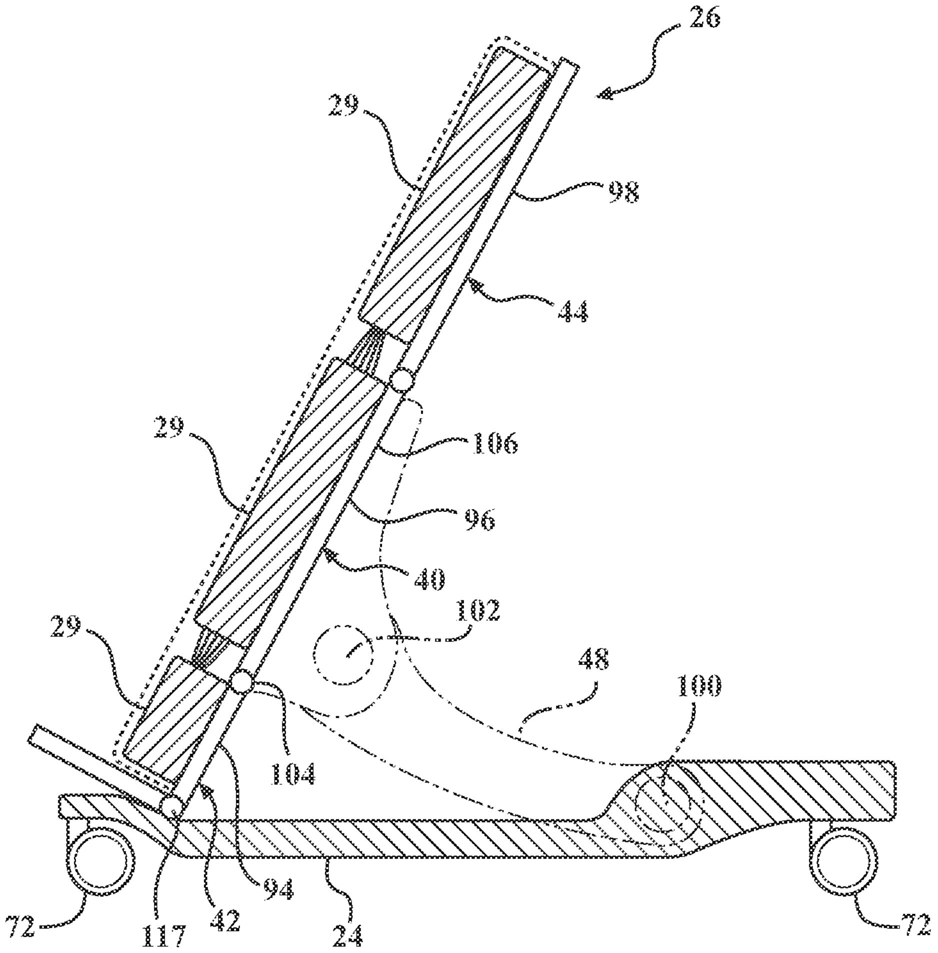
FIG. 14E is an elevational and partially cross-sectional view of a further configuration of the sections of the litter.

In one embodiment, as shown in FIG. 14E, the controller 120 is configured to control articulation of the sections of the litter 26 to put the litter 26 in a configuration that assists the patient with exiting the patient support apparatus 20, e.g. by placing the litter 26 into a standing or nearly upright configuration in which the sections 40, 42, 44 are parallel and inline. In this embodiment, the lift and tilt actuators 100, 102 may be controlled by the controller 120 to be positioned as shown or to further lower the footboard 78 (and/or the foot section 42) to the floor surface.

In one embodiment, the controller 120 is configured to control articulation and extension of the foot section 42 relative to the seat section 40 to maintain at least one predetermined positional criterion 126. The predetermined positional criterion 126 comprises maintaining a minimum distance between a location on the foot section 42 and the floor surface, maintaining a constant distance between the footboard 78 and the feet of the patient, mitigating shear on legs of the patient, and any combination thereof.

In one embodiment, the patient's legs are disposed on top of the mattress 29 with the mattress 29 being disposed above a joint between the foot section 42 and the seat section 40. A pivot point at the patient's knee and the joint between the foot section 42 and the seat section 40 may not be aligned. In this case, the controller 120 coordinates operation of the extension actuator 114 and the foot section actuator 104 to mitigate shear on the patient's legs resulting from misalignment of the pivot point of the patient's knee with the joint between the foot section 42 and the seat section 40 throughout articulation of the foot section 42 between the first configuration 50 and the second configuration 52. For instance, as the foot section 42 is articulated downwardly, the foot section 42 is simultaneously retracted and as the foot section 42 is articulated upwardly, the foot section 42 is simultaneously extended. The simultaneous extension/retraction can be at a constant rate relative to the articulation rate or at a variable rate relative to the articulation rate.

In one embodiment, the controller 120 is configured to control the foot section actuator system 116 to simultaneously extend or retract the foot section 42 while articulating the foot section 42 relative to the seat section 40 to maintain the minimum distance between the location on the foot section 42 and the floor surface. In another embodiment, the controller 120 is configured to control the foot section actuator system 116 to simultaneously extend or retract the foot section 42 while articulating the foot section 42 relative to the seat section 40 to maintain the constant distance between the footboard 78 and the feet of the patient. In other embodiments, the controller 120 is configured to coordinate operation of the foot section actuator system 116 and other actuators of the lift system 46 and/or articulation system 49 to maintain the at least one predetermined positional criterion 126 that requires sustaining a position of one section of the litter 26 relative to another component of patient support apparatus 20. In still other embodiments, the controller 120 is configured to control operation of the individual actuators independently.

In one embodiment, the controller 120 coordinates operation of the lift actuator 100 and the tilt actuator 102 to move the litter 26 to an elevated position relative to the base 24 while maintaining the orientation of the litter 26 relative to the floor surface.

In one embodiment, when the litter 26 moves from the first configuration 50 to the second configuration 52, the controller 120 coordinates operation of the lift actuator 100, tilt actuator 102, and foot section actuator 104 to move the seat section 40, foot section 42, and footboard 78 through engagement with one of the actuation surface 90 and the floor surface. The controller 120 continues to coordinate operation of the lift, tilt, and foot section actuators 100, 102, 104 so that the footboard 78 is in constant engagement with one of the actuation surface 90 and the floor surface and the foot section 42 moves beneath the seat section 40 and towards the seat section 40 until the litter 26 is in the second configuration 52, or the controller 120 coordinates operation of the lift actuator 100, tilt actuator 102, foot section actuator 104 and footboard actuator 117 to move to the second configuration 52.

In another embodiment, the controller 120 coordinates operation of the fowler section actuator 106 to move the fowler section 44 with movement of the seat and foot sections 40, 42 from the first configuration 50 to the second configuration 52.

In another embodiment, the controller 120 coordinates operation of the extension actuator 114 to extend or retract the foot section 42 with movement of the seat section 40, foot section 42, and/or fowler section 44 from the first configuration 50 to the second configuration 52. Coordinated operation of any of the actuators described herein may be employed to coordinate motion transitioning between configurations.

In one embodiment, the controller 120 coordinates operation of the extension actuator 114 to maintain a predetermined positional criterion 126 as the litter 26 moves from the first configuration 50 to the second configuration 52.

Conventional mattresses encounter difficulty in moving with the foot section 42 as the foot section 42 moves beneath the seat section 40 and into the second configuration 52. In many embodiments, the mattress 29 comprises a mattress assembly 128 to accommodate the change in geometry.

Figure 12A:
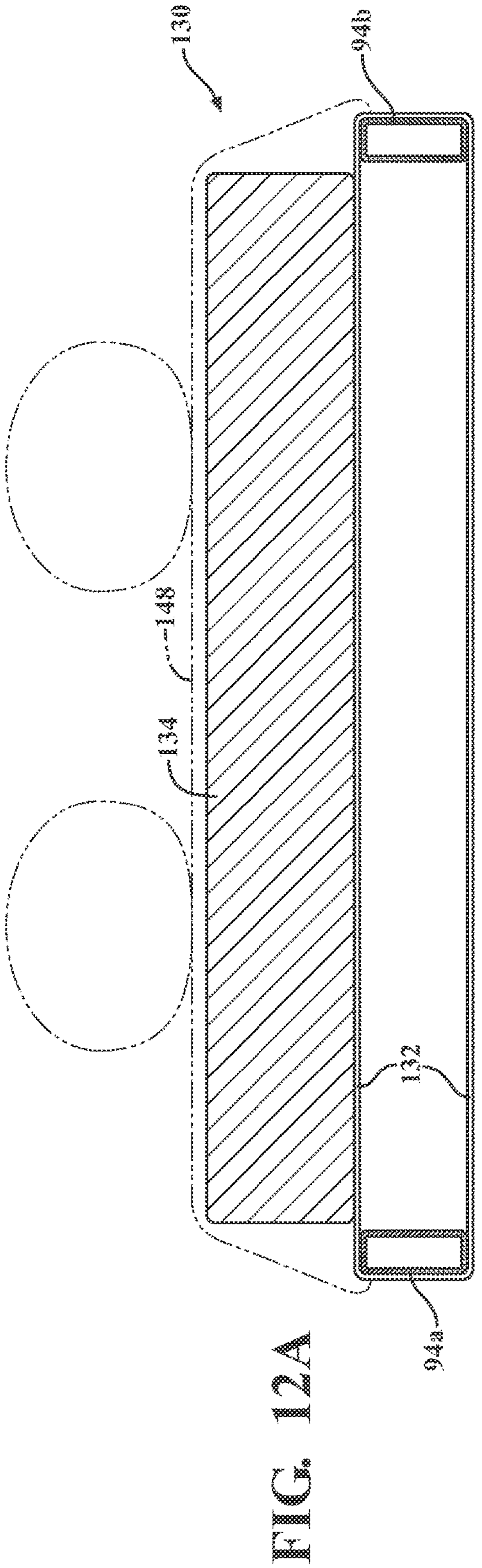
FIG. 12A is a cross-sectional view of one embodiment of a foot mattress segment of a mattress assembly being integrated with the foot section of the litter.
Figure 12B:
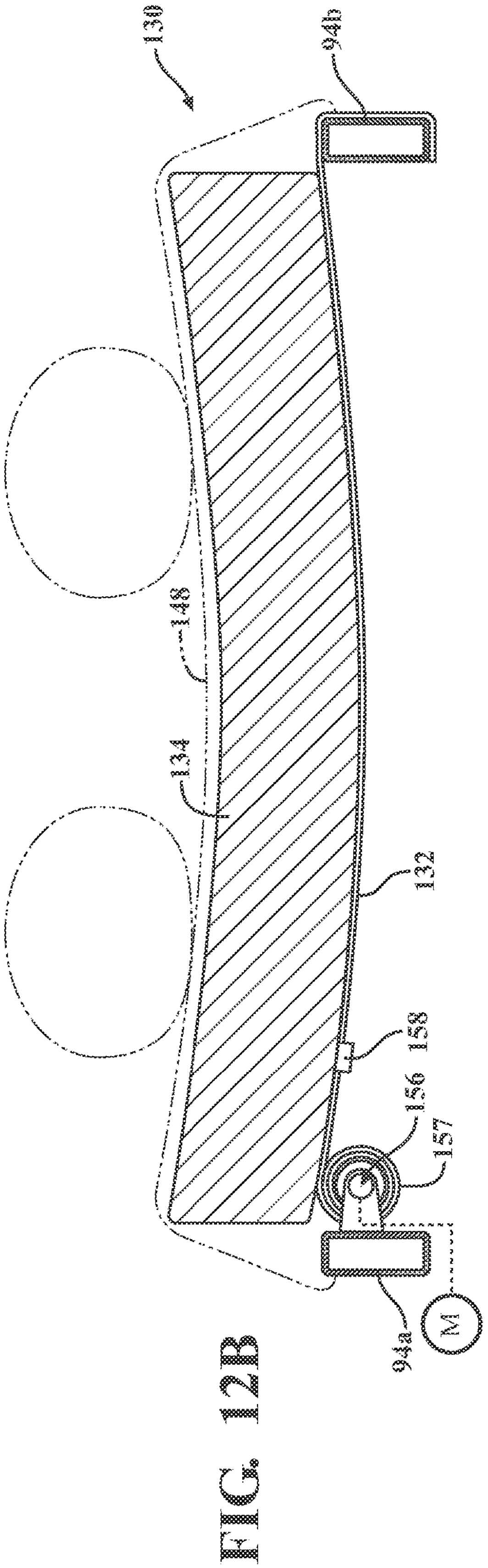
FIG. 12B is a cross-sectional view of another embodiment of the foot mattress segment of the mattress assembly being integrated with the foot section of the litter and having a first tension.
Figure 12C:
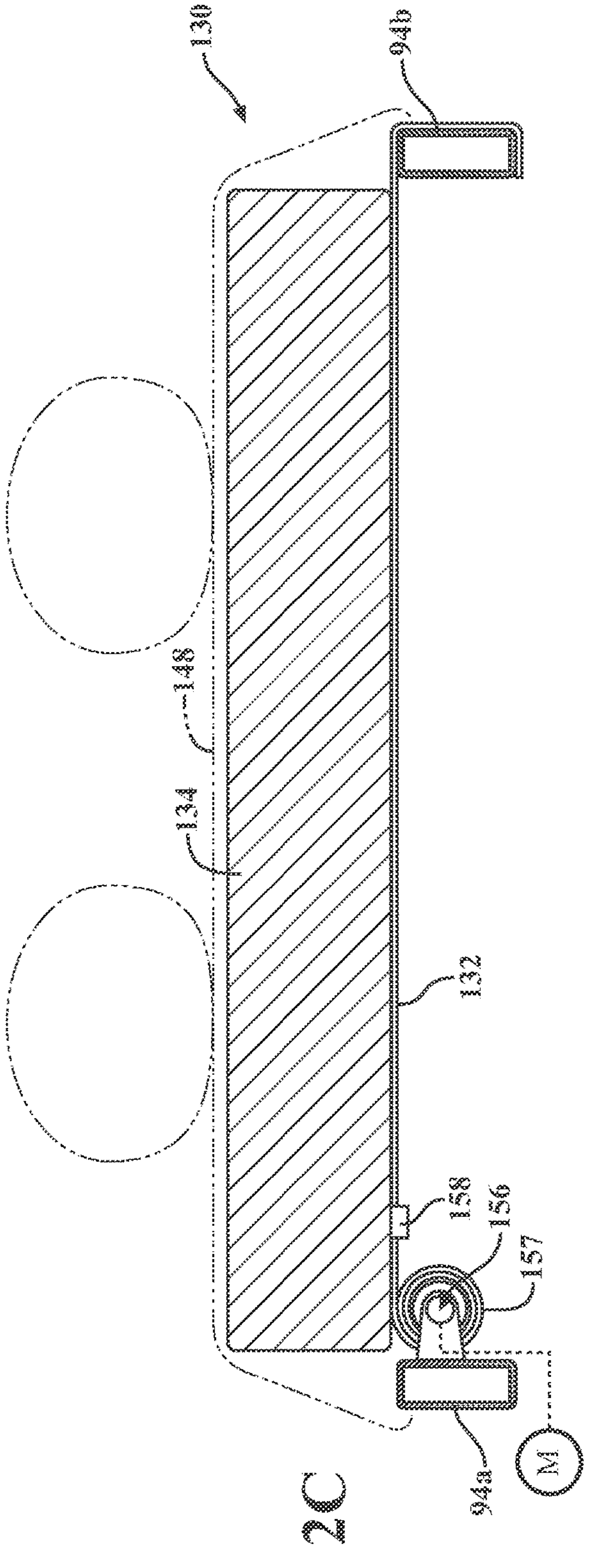
FIG. 12C is a cross-sectional view of another embodiment of the foot mattress segment of the mattress assembly being integrated with the foot section of the litter and having a second tension.

As shown in FIGS. 12A-12C, the mattress assembly 128 comprises a foot mattress segment 130 integral with the foot section 42 and movable with the foot section 42 to the stowed position beneath the seat section 40 with the foot mattress segment 130 retaining its position relative to the foot section 42 during articulation between the first configuration 50 and the second configuration 52. FIG. 12A illustrates a cross-section of a first embodiment of the foot mattress segment 130 and FIGS. 12B and 12C illustrate a cross-section of a second embodiment of the foot mattress segment 130 having a tension adjuster 156. In these embodiments, the foot mattress segment 130 comprises a lower suspension layer 132 carried by the foot section support frame 94 and an upper conformable layer 134 coupled to the suspension layer 132. In other embodiments, the conformable layer 134 is coupled to the foot section support frame 94 and/or the suspension layer 132.

The suspension layer 132 is directly connected to the foot section support frame 94 and forms a mattress base of the foot mattress segment 130 to support weight of the patient on the foot section 42. The patient's weight is supported on the foot mattress segment 130 in a manner that causes the mattress base and the conformable layer 134 to at least partially conform in shape to a portion of the patient as shown in FIG. 12B.

In one embodiment, the foot section support frame 94 comprises a pair of frame members **94*a*, 94*b* spaced apart from each other and the suspension layer 132 spans between the frame members 94*a*, 94*b*. In one embodiment, the suspension layer 132 comprises a compliant material. In another embodiment, the suspension layer 132 comprises a textile. The textile may comprise fabric. Further, the fabric may be woven. More specifically, the woven fabric may be an elastomeric material. In other embodiments, the woven fabric comprises a polymer such as polyester. In certain embodiments, the suspension layer 132 comprises Dymetrol®. Additional suspension layers 132 may also be provided in some cases. Furthermore, the suspension layer 132 may be a continuous layer formed in one sheet or material, or the suspension layer 132 may comprise several strips of material spanning the frame members 94*a*, 94*b*. In this case, the strips may be spaced from each other to define gaps therebetween. In alternative embodiments, the suspension layer 132** comprises multiple layers of compliant material.

In one embodiment, the conformable layer 134 is bonded to the suspension layer 132. The conformable layer 134 may be heat bonded to the suspension layer 132, may be bonded to the suspension layer 132 with an adhesive, and the like. The conformable layer 134 may be connected to the suspension layer 132 using any suitable method for connecting these layers. In alternative embodiments, the conformable layer 134 is coupled to the suspension layer 132 by mechanical fasteners such as hooks, clips, buttons, and the like. In further embodiments, the suspension layer 132 is stitched or interwoven with the conformable layer 134.

In one embodiment, the conformable layer 134 comprises at least one of a foam, a gel, and a pod material. In other embodiments, the conformable layer 134 comprises each of a foam material, a gel material, and a pod material, one or more foam materials, one or more gel materials, one or more pod materials or any combinations thereof.

In one embodiment, the foot mattress segment 130 has a thickness of less than three inches. Conventional mattresses typically have thicknesses around nine inches. Reducing the overall thickness of the foot mattress segment 130 also reduces the overall height of the litter 26 relative to the floor surface when the litter 26 is in the second configuration 52 because the foot section 42 is stowed beneath the seat section 40, which would otherwise require the seat section

40, and thus the litter 26 as a whole, to be raised to accommodate a thicker mattress stowed beneath the seat section 40. In other embodiments, the foot mattress segment 130 has a thickness of three inches or more.

As shown in FIGS. 12B and 12C, the mattress assembly 128 comprises a tension adjuster 156 operatively coupled to the suspension layer 132 to adjust a tension of the suspension layer 132. The tension adjuster 156 may comprise a motor M and a winding element 157 (e.g., a spool). The winding element 157 is configured to receive the suspension layer 132 to wind and unwind the suspension layer 132. In some cases, an opposing end of the suspension layer 132 (opposite the winding element 157) is fixed in position so that tension can be applied to the suspension layer 132 by winding the suspension layer 132 on the winding element 157.

In one embodiment, the controller 120 is in communication with the motor M of the tension adjuster 156 to control the motor M. A sensor 158 (e.g., one or more strain gauges) may be employed to determine a current tension of the suspension layer 132. The controller 120 may be configured to control the motor M and adjust the tension of the suspension layer 132 in response to feedback from the sensor 158 so that the tension is set at a desired tension. In some cases, various tensions may be desired in the suspension layer 132 depending on the configuration in which the litter 26 is placed, or depending on other conditions associated with the patient support apparatus 20 or the patient. For instance, in the chair configuration a higher tension may be desirable so that the suspension layer 132 does not hang, but is instead sufficiently taut. This may also apply when the foot section 42 is raised relative to the seat section 40. In alternative embodiments, tension may be adjusted without the use of a sensor 158. In other embodiments, at least one of the seat section 40 and the fowler section 44 comprise suspension layers 132 and conformable layers 134. Each section 40, 42, 44 of the litter 26 may have one or more tension adjusters and one or more sensors. Tension may be adjusted within each section 40, 42, 44 and separately or independently in each section 40, 42, 44 as desired.

In another embodiment, the controller 120 is configured to determine a weight of at least a portion of the patient based on feedback from the sensor 158.

Various embodiments of the mattress assembly 128 are shown below in FIGS. 13A-13D. In one embodiment shown in FIG. 13A, the mattress assembly 128 comprises a fowler mattress segment 136 integral with the fowler section 44 and a seat mattress segment 138 integral with the seat section 40. The fowler mattress segment 136 and the seat mattress segment 138 are integrated in the sense that they are connected to the fowler section support frame 98 and the seat section support frame 96 to form part of the fowler section 44 and seat section 40, respectively.

Figure 13A:
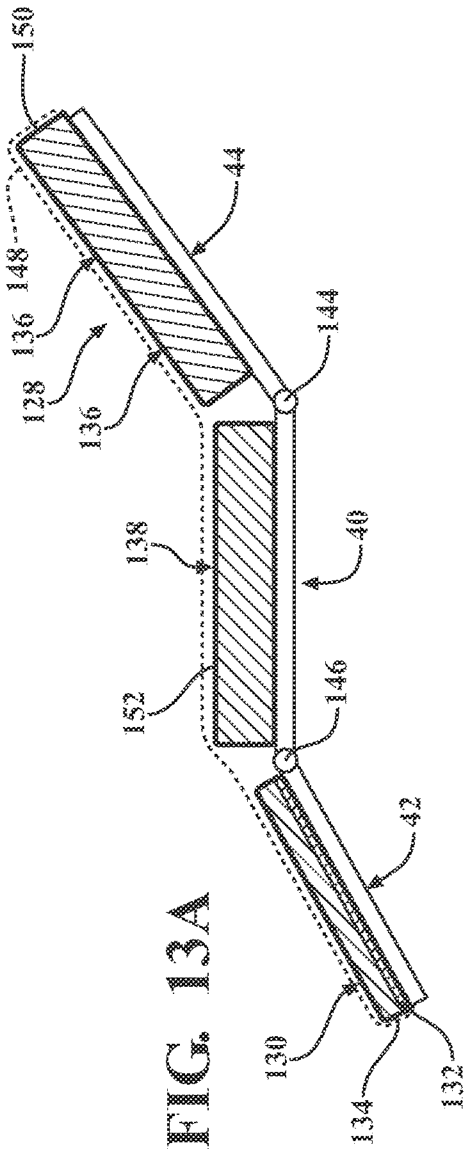
FIG. 13A is an elevational and partially cross-sectional view of one embodiment of the mattress assembly.
Figure 13B:
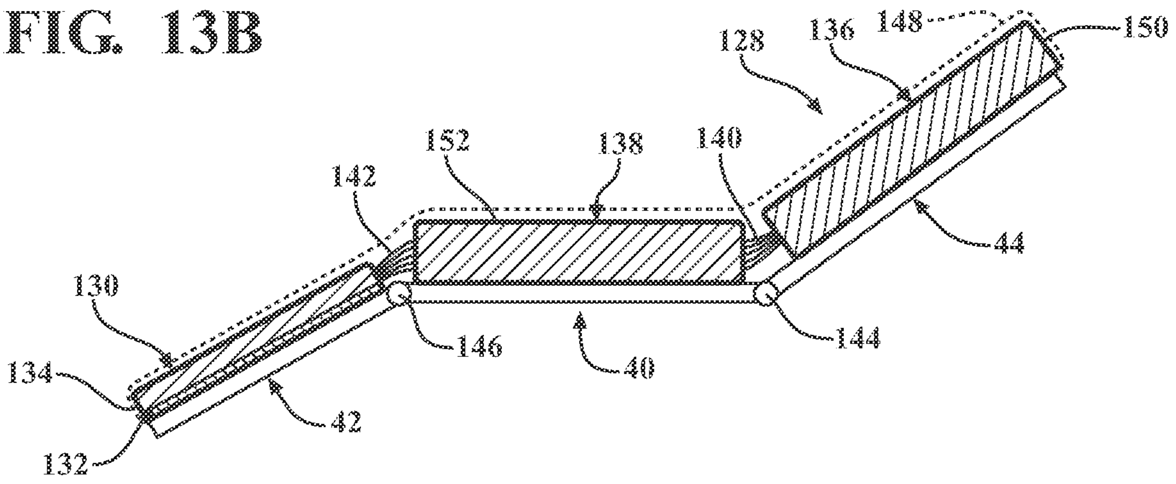
FIG. 13B is an elevational and partially cross-sectional view of another embodiment of the mattress assembly with a seat conformable layer and a fowler conformable layer fixed to a seat section and a fowler section, respectively.

In another embodiment shown in FIG. 13B, the mattress assembly 128 comprises a first connecting segment 140 interconnecting the fowler mattress segment 136 and the seat mattress segment 138. A second connecting segment 142 interconnects the seat mattress segment 138 and the foot mattress segment 130. The litter 26 comprises a first joint 144 between the fowler section 44 and the seat section 40 and a second joint 146 between the seat section 40 and the foot section 42. The foot section 42 is configured to move to the stowed position about the second joint 146. The mattress assembly 128 relies on the connecting segments 140, 142 to accommodate articulation about these joints 144, 146. The seat and fowler mattress segments 138, 136 are integral with the seat and fowler sections 40, 44, respectively. In particular, the connecting segments 140, 142 are configured to stretch about the joints 144, 146 such that the mattress segments 130, 136, 138 remain in a constant position relative to their associated support frames as the sections 40, 42, 44 move between the configurations.

Figure 13C:
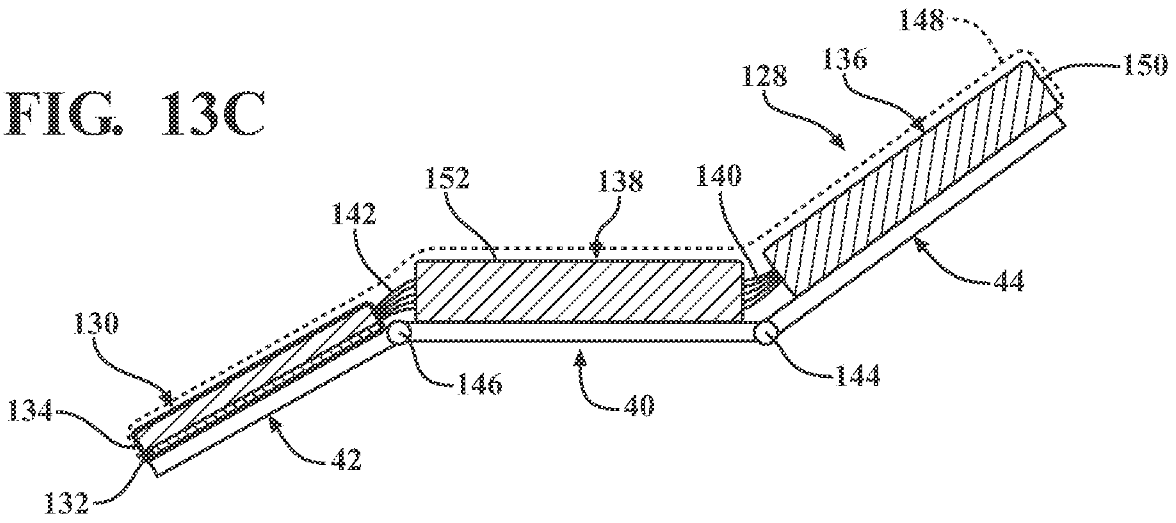
FIG. 13C is an elevational and partially cross-sectional view of a further embodiment of the mattress assembly with the seat conformable layer and the fowler conformable layer configured to move relative to the seat section and the fowler section, respectively.

In one embodiment shown in FIG. 13C, the seat and fowler mattress segments 138, 136 are not integral with the seat and fowler sections 40, 44, respectively. In contrast to FIG. 13B, the seat and fowler mattress segments 138, 136 are depicted with thinner lines than the foot mattress segment 130 to illustrate that they are not fixed to the seat and fowler sections 40, 44. Instead, the seat mattress segment 138 and the fowler mattress segment 136 are configured to slide against their respective support frames as required to accommodate the foot mattress segment 130 moving with the foot section 42 from the first configuration 50 to the second configuration 52.

In many embodiments, the mattress assembly 128 comprises an elastic covering 148 disposed over the mattress segments 130, 136, 138 and the connecting segments 140, 142.

In one embodiment, the fowler mattress segment 136 comprises a fowler conformable layer 150 and the seat mattress segment 138 comprises a seat conformable layer 152. Each of the fowler conformable layer 150 and the seat conformable layer 152 may comprise at least one of foam and gel material. In other embodiments, each of the fowler conformable layer 150 and the seat conformable layer 152 comprises both a foam material and a gel material, one or more foam materials, one or more gel materials, or any combinations thereof.

Figure 13D:
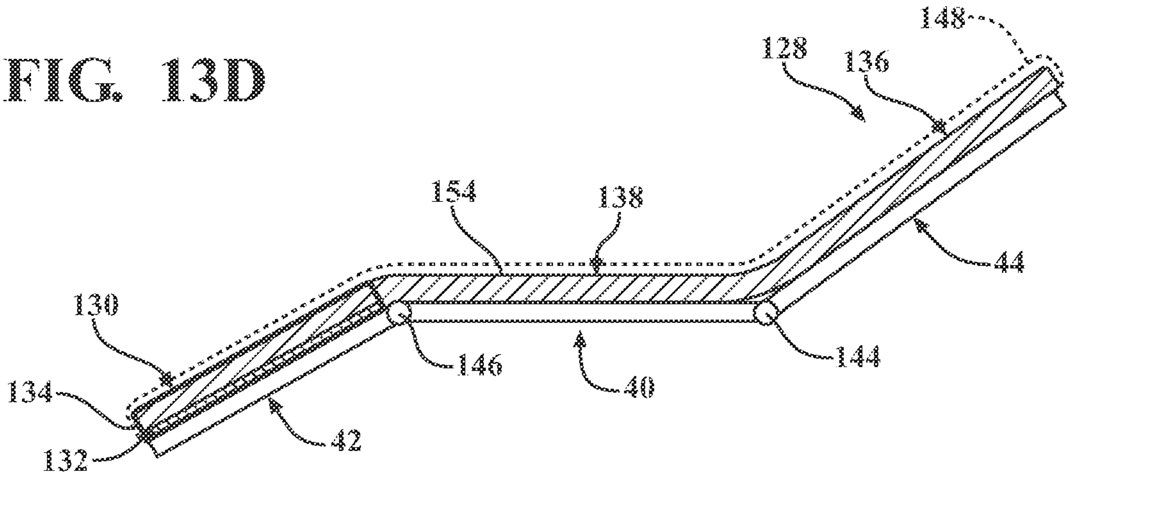
FIG. 13D is an elevational and partially cross-sectional view of a further embodiment of the mattress assembly.

In another embodiment shown in FIG. 13D, the seat and fowler mattress segments 138, 136 are replaced with one uniform conformable layer 154 that is integral with the conformable layer 134 of the foot mattress segment 130. The uniform conformable layer 154 is configured to move with the foot section 42 from the first configuration 50 to the second configuration 52, and move relative to the seat and fowler sections 40, 44 to accommodate being fixed relative to the foot section 42.

In one embodiment, at least one of the fowler mattress segment 136 and the seat mattress segment 138 comprise fluid bladders configured to provide therapy to the patient. A pump and fluid delivery system (not shown) may be provided to selectively provide fluid to the bladders. The pump and fluid delivery system may be located beneath the seat section 40 or beneath the fowler section 44, or otherwise accommodated on the patient support apparatus 20.

In another embodiment, the fluid bladders are used to provide active pressure distribution across at least one of the fowler mattress segment 136 and the seat mattress segment 138 to better distribute the weight of the patient and reduce pressure points.

In further embodiments, the fluid bladders are used to provide turn assistance to reduce the risk of a patient receiving bed sores from prolonged immobilization.

In one embodiment, the seat mattress segment 138 has a first thickness and the foot mattress segment 130 has a second thickness smaller than the first thickness. The fowler mattress segment 136 may have a similar first thickness as the seat mattress segment 138 such that the foot mattress segment 130 is thinner than both the fowler mattress segment 136 and the seat mattress segment 138.

It is to be appreciated that the terms "include," "includes," and "including" have the same meaning as the terms "comprise," "comprises," and "comprising."

Several embodiments have been discussed in the foregoing description. However, the embodiments discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

The invention claimed is:

1. A patient support apparatus for supporting a patient above a floor surface, the patient support apparatus comprising:

a base;

a litter including a first section, a second section arranged for pivoting movement relative to the first section about a first joint, and a third section arranged for pivoting movement relative to the first section about a second joint, the litter being operable between:

a first configuration in which the first section, the second section, and the third section are aligned generally horizontally above the floor surface for supporting the patient, and a second configuration in which the third section is pivoted about the second joint into a stowed position disposed beneath the first section out of support of the patient;

a lift system to move the litter relative to the base; and a mattress assembly including a first mattress segment operatively attached to the first section of the litter, a second mattress segment operatively attached to the second section of the litter, a third mattress segment operatively attached the third section of the litter, a first connecting segment interconnecting the second mattress segment and the first mattress segment, and a second connecting segment interconnecting the first mattress segment and the third mattress segment, wherein the first and second connecting segments are configured to stretch about the first and second joints, respectively, such that the first, second, and third mattress segments remain in a constant position relative to their associated first, second, and third sections as the litter moves from the first configuration to the second configuration;

wherein at least one of the first section, the second section, and the third section includes a section support frame;

wherein at least one of the first mattress segment, the second mattress segment, and the third mattress segment includes an upper conformable layer and a lower suspension layer carried by the section support frame; and further comprising:

a sensor to determine a current tension of the suspension layer, and a controller in communication with the sensor to determine a weight of at least a portion of the patient based on feedback from the sensor.

2. The patient support apparatus of claim 1, wherein the lift system includes first and second lift members coupling the litter to the base to move the litter relative to the base, with the first section being configured to articulate between the first and second lift members such that the first section is disposed vertically between the second section and the base and is disposed laterally between the first and second lift members.

3. The patient support apparatus of claim 1, wherein the suspension layer is directly connected to the section support frame and forms a base to support weight of the patient in a manner that causes the base to at least partially conform in shape with the conformable layer to a portion of the patient.

4. The patient support apparatus of claim 3, wherein the section support frame includes a pair of frame members with the suspension layer spanning between the frame members.

5. The patient support apparatus of claim 4, wherein the suspension layer comprises a compliant material suspended between the pair of frame members.

6. The patient support apparatus of claim 5, wherein each of the first section, the second section, and the third section includes a respective section support frame; and wherein each of the first mattress segment, the second mattress segment, and the third mattress segment includes a respective upper conformable layer and a respective lower suspension layer carried by the respective section support frame, the respective suspension layer being directly connected to the respective section support frame.

7. The patient support apparatus of claim 4, wherein the suspension layer includes a sheet coupled between the pair of frame members.

8. The patient support apparatus of claim 7, wherein the sheet comprises a compliant material suspended between the pair of frame members.

9. The patient support apparatus of claim 3, wherein the suspension layer comprises a woven elastomeric material.

10. The patient support apparatus of claim 9, wherein the conformable layer is bonded to the suspension layer.

11. The patient support apparatus of claim 10, wherein the conformable layer comprises at least one of foam or gel material.

12. The patient support apparatus of claim 3, wherein the mattress assembly includes a tension adjuster operatively coupled to the suspension layer to adjust a tension of the suspension layer.

13. The patient support apparatus of claim 12, wherein the controller is disposed in communication with the tension adjuster and is configured to adjust the tension of the suspension layer in response to feedback from the sensor.

14. The patient support apparatus of claim 1, wherein the first section is further defined as a seat section;

wherein the second section is further defined as a fowler section;

wherein the third section is further defined as a foot section; and wherein the second configuration is further defined with the foot section forming an acute angle relative to the seat section.

15. The patient support apparatus of claim 1, wherein the mattress assembly comprises an elastic covering disposed over the first, second, and third mattress segments and the first and second connecting segments.

16. The patient support apparatus of claim 1, wherein each of the first mattress segment, the second mattress segment, and the third mattress segment includes a respective conformable layer.

17. The patient support apparatus of claim 16, wherein each of the respective conformable layers comprise at least one of foam or gel material.

18. The patient support apparatus of claim 1, wherein at least one of the first mattress segment, the second mattress segment, and the third mattress segment comprise fluid bladders configured to provide therapy to the patient.

19. The patient support apparatus of claim 1, wherein the first mattress segment has a first thickness and the third mattress segment has a second thickness smaller than the first thickness.

20. A patient support apparatus for supporting a patient above a floor surface, the patient support apparatus comprising:

a base;

a litter including a first section, a second section arranged for pivoting movement relative to the first section about a first joint, and a third section arranged for pivoting movement relative to the first section about a second joint, the litter being operable between:

a first configuration in which the first section, the second section, and the third section are aligned generally horizontally above the floor surface for supporting the patient, and a second configuration in which the third section is pivoted about the second joint into a stowed position disposed beneath the first section out of support of the patient;

a lift system to move the litter relative to the base; and a mattress assembly including a first mattress segment operatively attached to the first section of the litter, a second mattress segment operatively attached to the second section of the litter, a third mattress segment operatively attached the third section of the litter, a first connecting segment interconnecting the second mattress segment and the first mattress segment, and a second connecting segment interconnecting the first mattress segment and the third mattress segment, wherein the first and second connecting segments are configured to stretch about the first and second joints, respectively, such that the first, second, and third mattress segments remain in a constant position relative to their associated first, second, and third sections as the litter moves from the first configuration to the second configuration;

wherein at least one of the first section, the second section, and the third section includes a section support frame;

wherein at least one of the first mattress segment, the second mattress segment, and the third mattress segment includes an upper conformable layer, a lower suspension layer directly connected to the section support frame and forming a base of the respective mattress segment to support the weight of the patient on the respective section in a manner that causes the base to at least partially conform in shape with the conformable layer to a portion of the patient, and a tension adjuster operatively coupled to the suspension layer to adjust a tension of the suspension layer; and further comprising:

a sensor to determine a current tension of the suspension layer, and a controller in communication with the tension adjuster and the sensor, the controller being configured to adjust the tension of the suspension layer in response to feedback from the sensor, and to determine a weight of at least a portion of the patient based on feedback from the sensor.

* * * * *